US007905949B2

(12) United States Patent
Crews et al.

(10) Patent No.: US 7,905,949 B2
(45) Date of Patent: *Mar. 15, 2011

(54) METHOD FOR PRODUCING BITUMINOUS COMPOSITIONS

(75) Inventors: Everett Crews, Charleston, SC (US);
Tom Girardeau, Mount Pleasant, SC (US); Iain Jack, Goose Creek, SC (US)

(73) Assignee: Meadwestvaco Corporation, Richmond, VA (US)

( * ) Notice: Subject to any disclaimer, the term of this patent is extended or adjusted under 35 U.S.C. 154(b) by 574 days.

This patent is subject to a terminal disclaimer.

(21) Appl. No.: 11/862,273

(22) Filed: Sep. 27, 2007

(65) Prior Publication Data

US 2008/0069638 A1    Mar. 20, 2008

Related U.S. Application Data

(63) Continuation-in-part of application No. 11/457,931, filed on Jul. 17, 2006, now abandoned, which is a continuation of application No. PCT/US2005/002916, filed on Jan. 27, 2005.

(60) Provisional application No. 60/545,713, filed on Feb. 18, 2004.

(51) Int. Cl.
*C08L 95/00* (2006.01)
*C09D 195/00* (2006.01)

(52) U.S. Cl. .......................................... 106/277; 524/60

(58) Field of Classification Search .................. 106/277; 524/60
See application file for complete search history.

(56) References Cited

U.S. PATENT DOCUMENTS

| | | | |
|---|---|---|---|
| 2,508,430 A | 5/1950 | Smith et al. |
| 3,520,709 A | 7/1970 | Mogg et al. |
| 3,728,278 A | 4/1973 | Tramelli |
| 4,008,096 A | 2/1977 | Knapp |
| 4,338,136 A | 7/1982 | Goullet et al. |
| 4,447,269 A | 5/1984 | Schreuders et al. |
| 4,450,011 A | 5/1984 | Schilling et al. |
| 4,462,840 A | 7/1984 | Schilling et al. |
| 4,464,285 A | 8/1984 | Schilling |
| 4,464,286 A | 8/1984 | Schilling |
| 4,478,642 A | 10/1984 | Schilling et al. |
| 4,494,992 A | 1/1985 | Schilling et al. |
| 4,523,957 A | 6/1985 | Graf et al. |
| 4,547,224 A | 10/1985 | Schilling |
| 4,561,901 A | 12/1985 | Schilling |
| 4,597,799 A | 7/1986 | Schilling |
| 4,676,927 A | 6/1987 | Schilling et al. |
| 4,786,720 A | 11/1988 | Schilling |
| 4,789,402 A | 12/1988 | Kostusyk et al. |
| 4,810,299 A | 3/1989 | Schilling et al. |
| 4,859,245 A | 8/1989 | Schilling et al. |
| 4,859,362 A | 8/1989 | Schilling |
| 4,861,377 A | 8/1989 | Schilling |
| 4,877,457 A | 10/1989 | Schilling et al. |
| 4,957,560 A | 9/1990 | Schilling |
| 4,976,784 A | 12/1990 | Schilling |
| 4,990,590 A | 2/1991 | Schilling |
| 4,990,591 A | 2/1991 | Schilling |
| 4,990,592 A | 2/1991 | Schilling |
| 4,995,909 A | 2/1991 | Schilling |
| 4,997,481 A | 3/1991 | Schilling |
| 5,008,382 A | 4/1991 | Schilling et al. |
| 5,019,168 A | 5/1991 | Schilling |
| 5,034,060 A | 7/1991 | Schilling et al. |
| 5,073,297 A | 12/1991 | Schilling |
| 5,079,362 A | 1/1992 | Schilling |
| 5,085,702 A | 2/1992 | Schilling et al. |
| 5,085,704 A | 2/1992 | Schilling et al. |
| 5,096,494 A | 3/1992 | Schilling et al. |
| 5,096,495 A | 3/1992 | Schilling et al. |
| 5,160,453 A | 11/1992 | Schilling |
| 5,178,674 A | 1/1993 | Schilling et al. |
| 5,256,195 A | 10/1993 | Redelius |
| 5,320,671 A | 6/1994 | Schilling |
| 5,328,505 A | 7/1994 | Schilling |
| 5,336,438 A | 8/1994 | Schilling et al. |
| 5,443,632 A | 8/1995 | Schilling |
| 5,596,032 A | 1/1997 | Schilling et al. |
| 5,667,578 A | 9/1997 | Schilling |
| 5,668,197 A | 9/1997 | Schilling |
| 5,670,562 A | 9/1997 | Schilling |
| 5,743,950 A | 4/1998 | Hendriks et al. |
| 5,772,749 A | 6/1998 | Schilling et al. |
| 5,776,234 A | 7/1998 | Schilling |
| 5,849,070 A | 12/1998 | Chambard et al. |
| 6,077,888 A | 6/2000 | Schilling |
| 6,106,604 A | 8/2000 | Durand et al. |
| 6,143,812 A | 11/2000 | Martin et al. |
| 7,297,204 B2 * | 11/2007 | Crews et al. .................. 106/277 |
| 2002/0058734 A1 | 5/2002 | Harlan |
| 2002/0170464 A1 | 11/2002 | Larsen et al. |
| 2005/0135879 A1 | 6/2005 | Grubba et al. |
| 2006/0236614 A1 | 10/2006 | Antoine et al. |
| 2006/0240185 A1 | 10/2006 | Antoine et al. |
| 2007/0060676 A1 | 3/2007 | Reinke |

(Continued)

FOREIGN PATENT DOCUMENTS

EP        1291391        11/2006

(Continued)

*Primary Examiner* — David M Brunsman
(74) *Attorney, Agent, or Firm* — MWV Intellectual Property Group

(57) ABSTRACT

This invention relates to bituminous compositions and methods of producing the same. More particularly, the invention relates to the production of bituminous compositions formulated with performance-graded bitumen-containing solvent-free bitumen emulsions which exhibit controllable, temperature-dependent interfacial rheology. When employed in paving applications, these bituminous compositions develop adhesive strength and load-bearing strength properties at rates comparable to traditional hot mix paving compositions and at rates faster than traditional cold mix paving compositions.

22 Claims, 3 Drawing Sheets

U.S. PATENT DOCUMENTS

| | | |
|---|---|---|
| 2007/0191514 A1 | 8/2007 | Reinke |
| 2008/0060551 A1* | 3/2008 | Crews et al. ............... 106/277 |
| 2008/0194738 A1* | 8/2008 | Crews et al. ............... 524/60 |

FOREIGN PATENT DOCUMENTS

| | | |
|---|---|---|
| EP | 1717369 | 11/2006 |
| EP | 1398351 | 6/2007 |
| JP | 60-168759 | 9/1985 |
| JP | 02-020626 | 1/2002 |
| RU | 2194062 | 7/2001 |
| WO | WO 92/19683 | 11/1992 |
| WO | WO 2005 081775 | 9/2005 |
| WO | WO2006106222 | 10/2006 |
| WO | WO2007032915 | 3/2007 |

* cited by examiner

METHOD FOR PRODUCING BITUMINOUS COMPOSITIONS

This application is a continuation-in-part of and commonly assigned U.S. application Ser. No. 11/457,931, filed Jul. 17, 2006, now abandoned which is a continuation of PCT application No. PCT/US2005/002916, filed Jan. 27, 2005, which claims priority from U.S. Provisional Application Ser. No. 60/545,713 filed Feb. 18, 2004.

BACKGROUND OF THE INVENTION

Cold mix paving compositions are made by mixing bitumen emulsion with aggregate at ambient temperature (i.e., temperature less than about 40° C.). However, certain problems have traditionally been associated with the use of such compositions where no solvent is present. For example, when one employs a slow-setting bitumen emulsion in the construction of load-bearing pavements the pavement is slow to cure and develop sufficient strength values adequate to support heavy traffic and to resist moisture damage. However, the use of a quick-setting bitumen emulsion often leads to premature breaking of the emulsion during handling and compaction (resulting in the formation of high air voids).

Various methods have been employed in attempts to accelerate the strength development of asphalt cold mixes made with bitumen emulsions. A number of these methods rely principally on shifting the pH of the emulsion or of the entire system to initiate or accelerate the break and coalescence of emulsion. U.S. Pat. No. 4,008,096 to Knapp (which is hereby incorporated by reference) is exemplary of this approach, teaching the injection of pH-shifting agents to initiate the coalescence of the emulsion.

However, these methods suffer from a lack of control of the timing of the pH-shifting chemistry. In any construction process involving bitumen emulsions, the premature breaking or coalescence of the bitumen emulsions adversely affects performance in production, handling, transport, and other end-use application operations. Prematurely broken emulsions often fail to adequately coat aggregate and generally result in high-viscosity bitumen-aggregate mixtures which can be troublesome to discharge from trucks, may excessively stick to paving equipment, and which can be difficult to compact to required pavement densities. Thus, the failure to effectively control the timing of the pH-shifting chemistry commonly leads to premature rupture of the bitumen emulsion and a cascade of undesirable effects on mix processing and pavement applications.

Attempts have been made to control the initiation of pH-shifting chemistries in bitumen emulsions. For example, U.S. Pat. No. 5,256,195 to Redelius (which is hereby incorporated by reference) teaches the use of anionic invert emulsions containing breaking agents in the aqueous phase of the water-in-oil emulsion in combination with slow-setting cationic emulsions as the main mixing and coating emulsion. Upon mechanical action of compaction the invert emulsion ruptures to expose the alkaline aqueous phase to the cationic mixing emulsion, thereby shifting the pH of the system and initiating emulsion break. Those skilled in the art recognize that the use of mineral oils and other solvents (i.e., so-called "cutter stocks") can lead to improvements in compactability. However, the use of cutter stocks can also result in decreases in the early compressive strength of compacted pavement. Dosages of cutter stocks as little as 0.1% by weight of the emulsion often decreases the compacted pavement compressive strength until such time as the cutter stock has evaporated into the atmosphere.

The formulation and production of fast-breaking bituminous emulsions by the use of rapid-setting (or spray-grade) or quick-setting emulsifiers is generally known (e.g., U.S. Pat. No. 4,338,136 to Goullet, et al., which is hereby incorporated by reference). However, approaches of this nature suffer from two drawbacks which make them unsuitable for construction of load-bearing asphalt pavements that exhibit complete aggregate coating, compact to required densities in the field, and develop strength rapidly. First, at ambient temperatures rapid-setting emulsions do not adequately coat dense-graded aggregates commonly used in construction of dense-graded, load-bearing pavements, because such rapid-setting emulsions tend to break immediately upon contact with mineral aggregate surfaces. The term "rapid-setting" is a defining characteristic of such emulsions (i.e., they immediately rupture and liberate water upon contact with mineral aggregate). Second, at ambient temperatures the immediate break of a rapid-setting emulsion produces a mix with high viscosity. The failure to adequately compact leads to low density pavements which fail under traffic due to deformation, disintegration, and/or, pot-hole formation (as water passes through the low density layer into the base where supporting pavement layers are degraded).

U.S. Pat. No. 5,743,950 discloses a process for preparing a bituminous composition by adding a hard bitumen binder having a penetration of less than 50 to a mixture of aggregates and a non-emulsified soft bitumen binder component. A hard binder component is defined as a binder component having a penetration of less than 200, as measured by ASTM D5 at 25° C. A soft binder component is defined as a binder component having a penetration of more than 700 as measured by ASTM D5 at 25° C. or a viscosity of less than 300 mPa·s. To obtain a bituminous composition with desired workability for load-bearing applications, an aggregate must be completely coated (i.e. mixed) with a soft binder prior to an addition of a hard binder. The bituminous composition must include both a hard bitumen binder and a soft bitumen binder. First, an aggregate is mixed with the soft bitumen to ensure a complete surface coating with the soft bitumen. Then, a hard bitumen is added to a mixture of aggregates and soft bitumen (i.e., aggregates surface coated with the soft bitumen) to impart stiffness and other desired properties for load-bearing applications. The hard bitumen may be added either in a form of powder or emulsion to mixture of a soft binder and an aggregate, namely an aggregated must be pretreated with a soft binder prior to a mixing with a hard binder. This process of producing bituminous composition requires a pretreatment of aggregate with soft binder prior to mixing with a hard binder; therefore, the equipment and process used to produce the bituminous composition must be designed to allow a pretreatment of aggregate.

Quick-setting emulsions are not suitable for the production of load-bearing asphalt pavement compositions at ambient temperatures for similar reasons. The use of large volumes of water beyond that present in the emulsion to promote coating of aggregate with quick-setting emulsions is not a feasible technique in the production of load-bearing pavements. First, load-bearing pavements are much thicker than the non-load-bearing surfaces produced by slurry seal coatings and micro-surfacings. The thicker load-bearing pavements must be compacted to density the mixture, as insufficient density can lead to rapid failure of load-bearing pavements due to deformation, disintegration, and pot-hole formation. Large water volumes prevent compaction in thick, load-bearing pavements to required densities because water is incompressible. Moreover, quick-setting emulsions develop high viscosity when stressed by high shear rate events such as compaction. As disclosed in U.S. Pat. Nos. 4,462,840 and 5,085,704, incorporated hereby by reference, retarders are generally needed to slow down the break of quick-setting emulsion systems so that the materials might be handled and placed upon the intended construction surface prior to the development of such cohesive strength that they do not flow or cannot be spread.

Slow-setting emulsifiers are commonly employed in the production at ambient-temperature of emulsion-based road paving compositions for load bearing pavements. Slow-setting emulsifiers produce bituminous emulsions which require little or no water to completely coat the aggregate surface. Moreover, the slow-setting nature of the emulsion yields a road paving composition with a controlled coalescence rate, so that the road paving mixture does not increase in viscosity to a point that it is unsuitable for handling, hauling, or compaction. With highly dense, high-fines aggregate gradations, slow-setting emulsions do not break either prior to or during compaction, thereby rendering the mixture easy to compact at ambient temperatures. However, pavement compositions made at ambient-temperature with slow-setting bituminous emulsions are very slow to develop adhesion and cure to strengths sufficient to bear the stress of heavy traffic.

In contrast to cold mix paving compositions, hot mix paving compositions do not contain bitumen emulsions, but are instead produced by mixing non-emulsified bitumen with aggregate at elevated temperatures (usually in excess of 140° C.). The two most common hot mix facilities, drum mix plants and batch plants, heat aggregate in a rotating kiln to extremely high temperatures to drive off all water adsorbed to the aggregate, as well as all water absorbed within the surface pores of the aggregate. Quantitative removal of water is required (1) to ensure complete aggregate coating and (2) to ensure that the finished hot mixture of aggregate and bitumen shows no moisture sensitivity in the finished pavement layer once it is transported, laid down, and compacted.

Hot, dry aggregate produced in conventional hot mix operations is mixed with bitumen (which is previously liquefied by heating to temperatures far in excess of its melting point) to produce what is known in the industry as the "hot mix asphalt." Hot mix asphalts generally must be produced, laid down, and compacted at temperatures in excess of about 160° C., as the compactability of the hot mix asphalt depends on the temperature. If the mix cools, the asphalt viscosity increases and the mixture cannot be compacted to the design density (known as percent air voids). When a hot asphalt-aggregate mixture cools to temperatures below about 85° C., the handling, placement, and compaction of the mixture become extremely difficult and design densities (air voids) cannot be realized.

Therefore, it is an object of the present invention to disclose a method of producing bituminous compositions that is simply and does not require a pretreatment of aggregate prior to mixing with bitumen emulsion.

Another object of the present invention is to disclose bituminous compositions which are suitable for use in paving applications and to provide a paved road.

Yet another object of the present invention is to produce bituminous compositions at temperatures substantially below those of hot mix asphalt compositions.

A further object of the present invention is to produce bituminous compositions, using rapid-setting and/or quick-setting emulsifiers, which exhibit substantially complete aggregate coating, compact to required densities in the field, and which rapidly develop load-bearing strength.

Other objects, features and advantages of the present invention will become apparent from the following detailed description.

SUMMARY OF THE INVENTION

The objects of this invention are met by a method for producing bituminous compositions suitable for use in paving applications, made by controlling temperature-dependent interfacial rheology in a broad range of solvent-free, high-residue bitumen emulsions containing bitumen. To produce the solvent-free bitumen emulsions in these paving compositions, emulsifiers are employed with structural characteristics that impart low interfacial viscosity, low Marangoni effect, and high interfacial bitumen solubility, at elevated temperatures. The use of bitumens in these emulsions with solubility parameters comparable with those of the emulsifier is preferred. The improved combination of emulsifiers, with structural attributes that impart improved control of interfacial stability and rheology in solvent-free bitumen emulsions at elevated temperatures relative to ambient cold mix technologies and at reduced temperatures relative to hot mix technologies, leads to load-bearing road paving compositions with improved densification and accelerated strength development in the compacted state.

This invention teaches the formulation of solvent-free bitumen emulsions, which are based on bitumens and which exhibit controllable, temperature-dependent interfacial rheology, and use of said these emulsions to fully coat aggregate, thereby producing bituminous compositions suitable for the construction of load-bearing pavements that exhibit improved compaction to densities similar or superior to those achieved in hot mix asphalt compositions and achieve cure rates to traffic-ready strengths far in excess of those achieved with compacted, conventional cold emulsion-based paving compositions and equal or superior to those of compacted, hot mix paving compositions.

When employed in paving applications, these bituminous compositions develop adhesive strength and load-bearing strength properties at rates comparable to traditional hot mix paving compositions and at rates faster than traditional cold mix paving compositions.

DESCRIPTION OF THE DRAWINGS

For a better understanding of the invention, reference may be made to the accompanying drawings wherein FIGS. 1, 2, and 3 demonstrate the effect of exposing bitumen emulsions to increasing shear stresses, thereby illustrating the high shear stability at elevated temperature (e.g., 60° C.-80° C.) exhibited by the bitumen emulsions of the present invention.

DETAILED DESCRIPTION OF THE INVENTION

Figure 1:
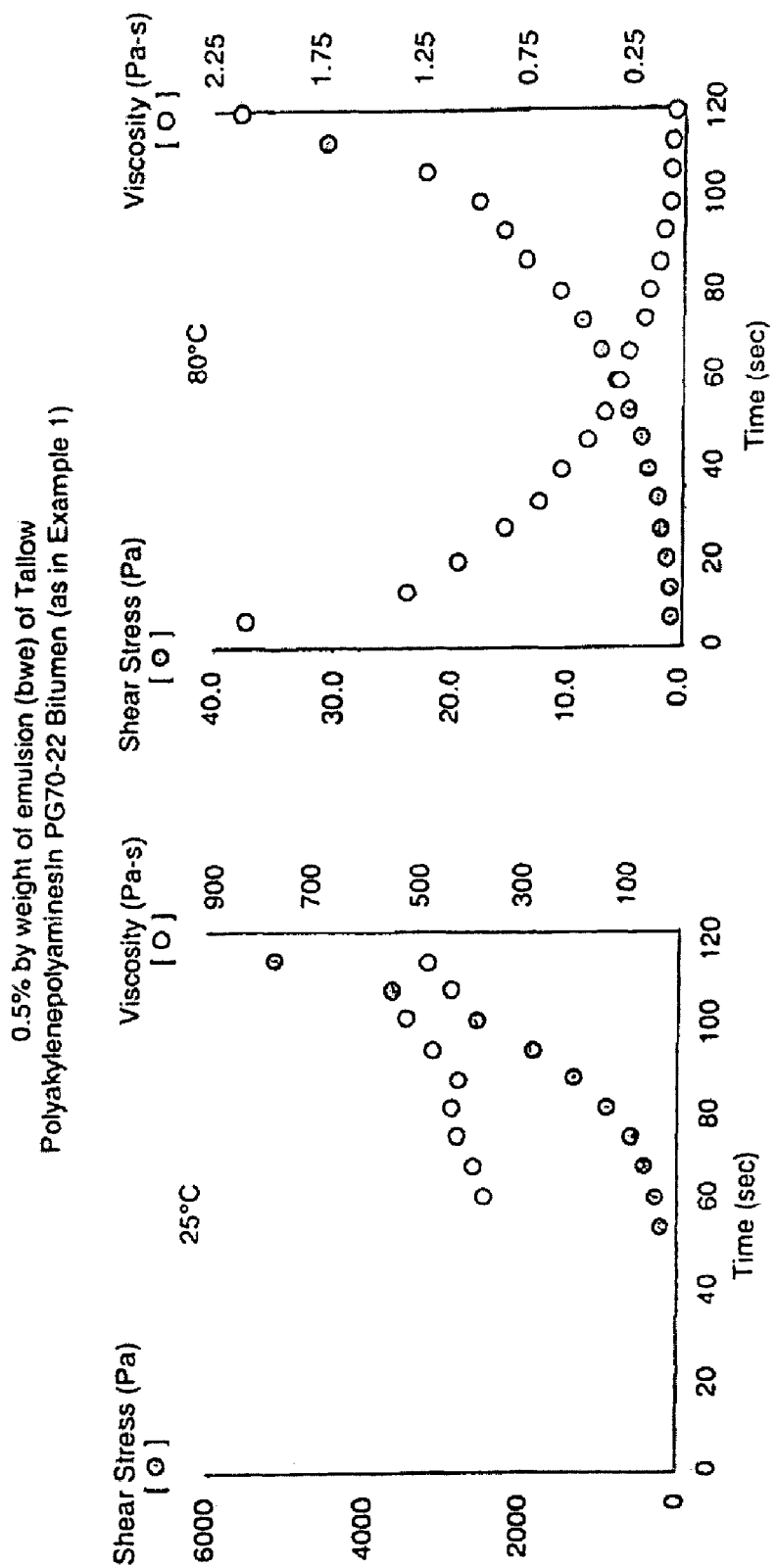
FIG. 1 shows the shear stress evaluation of a solvent-free bitumen emulsion produced in Example 1 containing 0.5% by total weight of bitumen emulsion (bwe) of emulsifier (tallow polyalkylenepolyamines) at 60% residue of PG70-22 bitumen.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements.

The terms "bitumen" or "bituminous" in the present invention refer to naturally-occurring bitumen and modified bitumen. They are also known as "asphalt."

The bituminous compositions of the present invention comprise bitumen emulsion and aggregate, but in an absence of bitumen having a penetration number, as determined according to an ASTM standard method D5 at 25° C., of more than 220 dmm. It is to be understood that the "aggregate" in the present invention also includes reclaimed asphalt pavement (RAP). The bitumen emulsion is solvent-free and contains bitumen, water, and an emulsifier or combination of emulsifiers having structural attributes that impart low interfacial viscosity, low Marangoni effect, and high interfacial bitumen solubility at a temperature range of about 60° C. to about 120° C. to improve interfacial stability and rheology of the emulsions.

Any known bitumen met specifications of performance grade, viscosity grade, or penetration graded may be used in the present invention. Suitable aggregates for use in the present invention have properties met specifications established by the appropriate transportation authorities as suitable for use in construction of load-bearing pavements.

The bituminous compositions of the present disclosure do not require a pretreatment of aggregation with soft bitumen prior to mixing with bitumen emulsion. The bituminous composition may be produced at a temperature from about 50° C. to about 140° C. by mixing the bitumen emulsion having a temperature from about 25° C. to about 95° C. with aggregate having a temperature from about 60° C. to about 140° C.

In one embodiment of the present invention, the disclosed bituminous composition comprises:
(a) solvent-free bitumen emulsion in an amount from about 2% to about 10% by total weight of the bituminous composition, wherein the emulsion comprises:
  (i) bitumen in an amount from about 50% to about 75% by total weight of the bitumen emulsion,
  (ii) at least one active emulsifier in an amount from about 0.05% to about 2.0% by total weight of the bitumen emulsion, and
  (ii) water in an amount to complete the emulsion; and
(b) aggregate in an amount from about 90% to about 98% by total weight of the bituminous composition; and
wherein the bituminous composition is in an absence of bitumen having a penetration number of more than 220 dmm as determined according to an ASTM standard method D5 at 25° C.

In one embodiment of the present invention, the disclosed bituminous composition comprises:
(a) solvent-free bitumen emulsion in an amount from about 2% to about 10% by total weight of the bituminous composition, wherein the emulsion comprises:
  (i) bitumen in an amount from about 60% to about 70% by total weight of the bitumen emulsion,
  (ii) at least one active emulsifier in an amount from about 0.05% to about 2.0% by total weight of the bitumen emulsion, and
  (iii) water in an amount to complete the emulsion; and
(b) aggregate in an amount from about 90% to about 98% by total weight of the bituminous composition; and
wherein the bituminous composition is in an absence of bitumen having a penetration number of more than 220 dmm as determined according to an ASTM standard method D5 at 25° C.

In one embodiment of the present invention, the disclosed bituminous composition comprises:
(a) solvent-free bitumen emulsion in an amount from about 2% to about 10% by total weight of the bituminous composition, wherein the emulsion comprises:
  (i) bitumen in an amount from about 50% to about 75% by total weight of the bitumen emulsion,
  (ii) at least one active emulsifier in an amount from about 0.08% to about 0.75% by total weight of the bitumen emulsion, and
  (iii) water in an amount to complete the emulsion; and
(b) aggregate in an amount from about 90% to about 98% by total weight of the bituminous composition; and
wherein the bituminous composition is in an absence of bitumen having a penetration number of more than 220 dmm as determined according to an ASTM standard method D5 at 25° C.

In one embodiment of the present invention, essentially all of the bitumen in the emulsion has a penetration number of less than 220 dmm as determined according to an ASTM standard method D5 at 25° C.

In addition to bitumens, modified bitumens may be used in the present disclosure. As used herein, the "bitumens" and "modified bitumens" are those which exhibit rheological properties that are appropriate for paving applications under specific climatic conditions, for example, those which conform to the Strategic Highway Research Program (SHRP) pavement binder specifications. The bitumen component may be naturally occurring bitumens (such as Trinidad Lake asphalt and the like), or derived from crude oil. Also petroleum pitches (such as asphalt) obtained by a cracking process and coal tar can be used as well as blends of bituminous materials.

Any additive which is traditionally added to bitumen to produce a modified bitumen meeting property specifications and performance standards (such as SHRP) are suitable. Such additives include, but are not limited to, natural rubbers, synthetic rubbers, plastomers, thermoplastic resins, thermosetting resins, elastomers, and combinations thereof. Examples of these additives include styrene-butadiene-styrene (SBS), styrene-butadiene-rubber (SBR), polyisoprene, polybutylenes, butadiene-styrene rubbers, vinyl polymers, ethylene vinyl acetate, ethylene vinyl acetate derivatives, neoprene and the like. It is preferred that the modified bitumen contain at least one member selected from the group consisting of styrene-butadiene-styrene, styrene-butadiene-rubber, sulfur-modified bitumen, acid-modified bitumen and combinations thereof. It is well within the ability of a skilled artisan to produce modified bitumen containing the noted additives.

Where desired, additional additives traditionally employed in the production of bitumen emulsions may be incorporated into the aqueous phase of the bitumen emulsion in order to adjust the characteristics of the finished mix. Suitable additives include styrene-butadiene-rubber latex, polyisoprene latex, neoprene, associative thickeners, starches, salts, and the like.

From about 0.05% to about 2.0% (preferably from about 0.1% to about 0.75%, and more preferably from about 0.08% to about 0.5%) by total weight of the bitumen emulsion of the present disclosure is comprised of at least one emulsifier. Suitable emulsifiers include: amphoteric emulsifiers, cationic emulsifiers, nonionic emulsifiers and combinations thereof.

Bitumen emulsions are of the oil-in-water type; they consist of a suspension of bituminous particles dispersed in the water phase. These particles have, in the case of cationic emulsions, a positive charge. The pH of cationic emulsions is below pH 7.0. As the term implies, amphoteric emulsifiers are characterized by the capacity to lower interfacial tensions between dissimilar materials (e.g., bitumen and water) at pH values both above and below 7.0. The charge of the disperse-phase oil droplets in amphoteric emulsions may be either positive or negative. It is well within the ability of those skilled in the art to combine the bitumen and the emulsifiers taught herein to prepare the solvent-free bitumen emulsions of the present disclosure.

Ionic emulsifiers which are suitable for use in the present disclosure include amphoteric emulsifiers, cationic emulsifiers, and combinations thereof.

As used herein the term "amphoteric emulsifiers" includes both mono-amphoteric and polyamphoteric emulsifiers. Amphoteric emulsifiers which are suitable for use in the present disclosure include, but are not limited to, the following: lithium C-12 to C-24 alkyl amidopropyl halide methyl carboxylate betaines, sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, potassium C-12 to C-24 alkyl amidopropyl halide sulphate betaines, C-12 to C-24 fatty ester acrylic derivative of polyethylene polyamines such as those obtained by reacting C-12 to C-24 fatty acids with acrylic acid, maleic anhydride, fumaric acid, and/or other ene- and dieneophiles, and then reacting the resulting chemical with polyethylene polyamines, rosin ester acrylate derivative of polyethylene polyamines such as those obtained by reacting rosin acids with acrylic acid, maleic anhydride, fumaric acid, and/or other ene- and dieneophiles, and then reacting the resulting chemical with polyethylene polyamines.

Cationic emulsifiers which are suitable for use in the present disclosure include, but are not limited to, the following: fatty imidazolines derived from C-12 to C-24 fatty acids; fatty imidoamines derived from C-12 to C-24 (preferably C-16 to C-18) fatty acids; rosin imidoamines such as those obtained by reacting rosin acids with maleic anhydride, fumaric acid, and/or other ene- and dieneophiles and then reacting the resulting chemical with polyalkylenepolyamines; fatty amidoamines derived from C-12 to C-24 (preferably C-16 to C-18) fatty acids, rosin amidoamines such as those obtained by reacting rosin acids with maleic anhydride, fumaric acid, and/or other ene- and dieneophiles and then reacting the resulting chemical with polyalkylenepolyamines; saturated C-12 to C-24 alkyl monoamines, unsaturated C-12 to C-24 alkyl monoamines, saturated C-12 to C-24 alkyl polypropylenepolyamines; unsaturated C-12 to C-24 alkyl polypropylenepolyamines; C-12 to C-24 alkyl monoamine polyoxyethylene such as those obtained by reacting C-12 to C-24 alkyl monoamines with ethylene oxide; C-12 to C-24 alkyl monoamine polyoxypropylene such as those obtained by reacting C-12 to C-24 alkyl monoamines with propylene; C-12 to C-24 alkyl polypropylene monoamines polyoxyethylene such as those obtained by reacting C-12 to C-24 alkyl polypropylenepolyamines with ethylene oxide; C-12 to C-24 alkyl polypropylene monoamines polyoxypropylene such as those obtained by reacting C-12 to C-24 alkyl polypropylene monoamines with propylene oxide; saturated C-12 to C-24 alkyl aryl monoamines, unsaturated C-12 to C-24 alkyl aryl monoamines; saturated C-12 to C-24 alkyl aryl polypropylenepolyamines, unsaturated C-12 to C-24 alkyl aryl polypropylenepolyamines; C-12 to C-24 quaternary amines; C-12 to C-24 alkyl ether amines; C-12 to C-24 alkylether polyamines; C-12 to C-24 alkyl polypropylene polyamine N-oxides; amine derivatives of tannins, amine derivatives of phenolic resins; amine derivatives of lignins, amine-modified polyacrylates; and combinations thereof. It is preferred that the cationic emulsifier be a member selected from the group consisting of saturated C-12 to C-24 alkyl monoamines, unsaturated C-12 to C-24 alkyl monoamines, saturated C-12 to C-24 alkyl polypropylenepolyamines, unsaturated C-12 to C-24 alkyl polypropylenepolyamines, and combinations thereof. It is further preferred that the cationic emulsifier be a blend of at least one member selected from the group consisting of saturated and unsaturated C-12 to C-24 alkyl monoamines with at least one member selected from the group consisting of saturated and unsaturated C-12 to C-24 alkyl polypropylenepolyamines. As used herein, the term "cationic emulsifiers" includes the above-noted compounds and their derivatives.

The emulsifiers of the present disclosure not only convey the high-temperature shear-stability needed for mixing (and subsequent compacting) of the bituminous compositions, but also impart a high viscosity to the bitumen emulsion (so that no thickener is needed for emulsion stability or for increased film coating on the aggregate) to enhance bitumen wetting of the aggregate surface, and to lower interfacial tension between the bitumen film and aggregate (so that a strong adhesive bond is maintained and water damage to the pavement is prevented).

Emulsifier formulations are further classified as rapid-setting (i.e., spray-grade), quick-setting, and slow-setting depending on the speed with which a given emulsion, using an economical dosage of emulsifier, will break upon contact with mineral aggregate. While rapid-setting, quick-setting, and slow-setting emulsifiers are suitable for use in the present disclosure, it is preferred to employ rapid-setting or quick-setting emulsifiers. It is further preferred to employ rapid-setting emulsifiers with dense-graded aggregate. This preference arises from the need to control such emulsion properties as the interfacial viscosity, Marangoni effect, and interfacial bitumen solubility at the elevated temperature of the present disclosure (i.e., about 50° C. to about 120° C.) and concurrently at low emulsifier dosages. Quick-setting and slow-setting emulsifiers require higher dosages and do not impart the target interfacial properties in the finished emulsion. Additionally, high emulsifier dosages are costly, contribute to low rates of compressive strength development, and increase moisture sensitivity in the finished pavement.

It is preferred that the bitumen emulsion be solvent-free. Environmental concerns have driven the reduction, up to elimination, of organic solvents from paving bitumen emulsions. However, for technical reasons total elimination has not been available in all paving applications prior to the availability of the present disclosure. Thus, in certain districts the term "solvent-free" is defined to include a minor portion of organic solvents. For example, "solvent-free" has at one time been defined in the state of Pennsylvania to include up to 4% organic solvents. For the purposes of this disclosure, therefore, where desired the bitumen emulsion may contain at least one solvent (such as naphtha, kerosene, diesel, flux, and the like) at a level less than that needed to facilitate either: 1) the mixing of the bituminous composition at ambient temperature to yield fully-coated aggregate, or 2) the compaction of the bituminous composition at ambient temperatures. Where added, it is preferred in the present disclosure that the level of solvent be less than about 1.0% by total weight of the bitumen emulsion. As used herein, the term "ambient temperatures" means an environmental temperature of less than about 40° C.

Where desired, the bitumen emulsions of the present disclosure may be stored at temperatures in the range of about 60° C. to about 80° C. for prolonged periods of time without adversely affecting the particle size distribution of the emulsions.

The bituminous compositions of the present disclosure are produced at a temperature in the range of about 50° C. to about 140° C. (preferably in the range of about 55° C. to about 120° C., and more preferably in the range of about 60° C. to about 80° C.) by mixing from about 2.0% to about 10% by total weight of the bituminous composition of the bitumen emulsion at a temperature in the range of about 25° C. to about 95° C. (preferably in the range of about 60° C. to about 80° C.), and from about 90% to about 98% by total weight of the bituminous composition of aggregate at a temperature in the range of about 60° C. to about 140° C. (preferably in the range of about 60° C. to about 120° C.). It will be understood by those skilled in the art that the bitumen emulsion may be mixed cold (e.g., at ambient temperatures) and then heated.

Aggregate used in paving materials and road construction, road rehabilitation, road repair, and road maintenance are derived from natural and synthetic sources. As in any construction process, aggregate are selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project. Among the aggregate properties that is key to successful road construction is gradation, which refers to the percent of aggregate particles of a given size. For most load-bearing asphalt pavements, three gradations are common: dense-graded, gap-graded, and open-graded. Dense-graded aggregate exhibit the greatest mineral surface area (per unit of aggregate). Open-graded aggregate largely consist of a single, large-sized (e.g., around 0.375 to 1.0 inch) stone with very low levels (typically less than about two percent of the total aggregate) of fines (material less than 0.25 inch) or filler (mineral material less than 0.075 mm). Gap graded aggregate fall between dense-graded and open-graded classes. Reclaimed asphalt pavement (RAP) material generally reflects the gradation of the pavement from which the reclaimed material was obtained. If the original pavement was a dense-graded mix, the RAP will also be dense graded, although the filler content is generally observed to be lower than the design limits of the origin aggregate specifications.

Any aggregate which is traditionally employed in the production of bituminous paving compositions is suitable for use in the present disclosure, including dense-graded aggregate, gap-graded aggregate, open-graded aggregate, reclaimed asphalt pavement, and mixtures thereof. Aggregate which is not fully dried can be employed in the present disclosure.

Where used in paving applications, it is preferred that the bituminous compositions of the present disclosure be applied to the surface to be paved at a temperature in the range of about 50° C. to about 120° C. (preferably in the range of about 55° C. to about 100° C., and more preferably in the range of about 60° C. to about 80° C.).

Once applied to the surface to be paved, the bituminous compositions of the present disclosure can be compacted as desired using any of the compaction methods traditionally employed for paving applications. It is preferred that the applied bituminous compositions be compacted to an air void content comparable to hot mix pavement compositions made at temperatures exceeding 140° C. having substantially equivalent aggregate gradation and bitumen content.

Likewise, it is further preferred that the applied bituminous compositions be compacted to an air void content lower than comparable cold mix pavement compositions made at ambient temperatures (i.e., temperatures less than about 40° C.) having substantially equivalent aggregate gradation and bitumen content.

It is also further preferred that the applied bituminous compositions be compacted to develop load-bearing strength at a rate comparable to hot mix pavement compositions made at temperatures exceeding 140° C. having substantially equivalent aggregate gradation and bitumen content.

Likewise, it is also further preferred that the applied bituminous compositions be compacted to develop load-bearing strength at a faster rate than that developed by comparable cold mix pavement compositions made at ambient temperatures having substantially equivalent aggregate gradation and bitumen content.

Strength development in cold mix pavement compositions is a function of the development of adhesion between bitumen and aggregate. It is, therefore, preferred that the applied bituminous compositions be compacted to develop adhesion between bitumen and aggregate at a faster rate than that developed by comparable cold mix pavement compositions made at ambient temperatures having substantially equivalent aggregate gradation and bitumen content.

The method of the present disclosure is suitable for use in thin lift overlay paving applications. Thin lift overlays is a maintenance paving technique that traditionally involves the placement of a thin lift of a bituminous composition produced according to standard hot-mix procedures at temperatures normally exceeding 165° C. and applied at corresponding temperatures in the field to an existing, damaged or distressed pavement surface. The current thin lift technology using hot-mix bituminous compositions commonly suffers from two chief deficiencies. The hot bituminous compositions tend to cool quickly, making it difficult to extend (i.e., spread) onto the existing pavement surface (at ambient temperatures) that is in need of maintenance or repair. This rapid cooling of the thin lift of hot bituminous material can cause compaction difficulties. The problems that arise in construction (e.g., extension, spreading, and compaction) due to rapid cooling can be aggravated by the use of polymer-modified bitumens. Polymer-modified bitumens have viscosities higher than unmodified bitumens at a given temperature. Thus, hot-mix bituminous compositions (mixtures with aggregate) made with polymer-modified bitumens are more viscous than equivalent bituminous compositions made with unmodified bitumen at a given construction temperature. As a consequence of this increased viscosity and increased resistance to flow, a thin lift bituminous composition made with polymer-modified bitumen can exhibit even greater problems in handling and construction as the material cools rapidly.

Where desired, the methods and bituminous compositions of the present disclosure can be employed in the production of bituminous paving blocks. In this technology, bitumen emulsion and aggregate are mixed to form a bituminous composition that is cast in molds, compacted, and allowed to cure. The cured blocks (or bricks) are used to construct pavements.

Where used in the production of bituminous paving blocks, it is preferred that the bituminous compositions of the present disclosure be cast in the mold and compacted at a temperature in the range of about 50° C. to about 120° C. (preferably in the range of about 55° C. to about 100° C., and more preferably in the range of about 60° C. to about 80° C.).

Due to the enhanced compaction (leading to higher density and higher strength) and accelerated cure rates (leading to increased production rates and improved manufacturing economics) exhibited by the bituminous compositions of the present disclosure, the employment of the methods and bituminous compositions of the present disclosure offers improvements over the construction of these blocks using traditional cold mix paving compositions.

Bituminous compositions of the present disclosure should be maintained at a temperature in the range of about 50° C. to about 120° C. (preferably in the range of about 55° C. to about 100° C., and more preferably in the range of about 60° C. to about 80° C.) for the period of time between the production of the bituminous compositions and their use in paving applications. It is preferred that the bituminous compositions be maintained at these temperatures in closed systems (such as relatively large stockpiles, storage silos, covered transport vehicles, and the like) to prevent evaporation of moisture.

Equipment traditionally utilized in the production of asphalt emulsion mixes includes pug mills of either batch or continuous variety. Pug mills impart high shear to the emulsion as it is ground with coarse aggregate, fines, and filler. Hot mix asphalt compositions are typically produced in continuous or batch operations. Continuous plants typically use drum mixtures of either parallel flow or counter flow variety. These mixers are high shear mixers as aggregate (which is heated in the drum or batch mixer to the specified process temperatures) tumbles down the inclined drum and as bitumen emulsion is sprayed onto the warm aggregate. The emulsion treated aggregate also tumbles downward through the drum mixer. The interior wall of most drum mixers is lined with vanes that repeatedly catch the mix, lift it up as the drum rotates, and deposit it back to the bottom of the drum. Drum and batch plants are capable of throughput of many hundred tons of paving material per hour. While it is preferred to employ drum mixers or batch mixers in the production of the bituminous compositions of the present disclosure, any method of mixing bitumen emulsion and aggregate traditionally utilized in the production of paving compositions can be used.

A common problem associated with the high shear event of mixing has been a coarsening of the emulsion. The emulsifier formulations described herein impart high-temperature rheological properties to the solvent-free emulsion, which in turn stabilize the emulsion against the mechanical stresses imparted on the emulsion by the mechanical action of mixing with aggregate at elevated temperatures. These mechanical and shear stresses have commonly caused a coarsening of the emulsion with most traditional emulsifier formulations, leading to a reduction in the degree of aggregate coating and an increase in the viscosity of the mix, with the latter resulting in poor densification of the paving composition during compaction. Poor densification during compaction can result in a number of pavement distress problems (such as rutting, pothole formation, and raveling). While the use of high emulsifier dosages can mitigate this coarsening, such dosages can also retard the development of compressive strength, an undesirable outcome.

The rheology of the disperse-phase droplets in the bitumen emulsions of the present disclosure directly influences the behavior of the emulsions when mixed at elevated temperatures with heated aggregate. The rheology at the oil-water interface is, in turn, controlled by the structure and chemistry of the emulsifiers. Emulsifier structure and chemistry affect the energy required to disperse the emulsifier at the interface. Emulsifier structure and chemistry determine the shear stability of the oil-water droplets against coalescence under high-temperature shear conditions, such as those exhibited during mixing of emulsions and aggregate at temperatures above ambient. Emulsifier structure and packing affect the interfacial fluidity or viscosity. Further, proper choice of emulsifier structure affects the magnitude of the effect on the interfacial viscosity.

The observation that some chemical entities produce the desired effect of rapid early strength development, while others do not, further suggests that the chemistry of the formulation is also an influencing factor. A further observation that the bitumen emulsions which behave as desired have higher levels of shear stability than those which do not show this behavior would suggest this chemical contribution results from the emulsifier. The observation that strength development in the bituminous compositions of the present disclosure is associated with better compressibility than traditional cold mixes very strongly suggests that the specific physicochemical effect is a change in the rheology of the bitumen droplets within the emulsion. The early strength development exhibited by the bituminous compositions of the present disclosure which is more characteristic of a hot mix than a cold mix also indicates that the rheological response of the bitumen droplets is an interfacial rather than a bulk response.

A variant of the above mechanism which is consistent with the currently available data and observations of the present disclosure consists of a heat dependant activation of the interfacial solubility of the ionic emulsifier. Interfacial solubility within the present context may be defined as localization of the emulsifier at the interface. No distinction should be made at the present time between surface adsorption (the emulsifier resides not within the aqueous phase of the bitumen emulsion but at the interface with certain functional groups penetrating into the bitumen), penetration of the interface by the emulsifier (residing within the surface of the bitumen droplet with functional groups oriented towards the water and others oriented towards the interior of the bitumen phase of the bitumen emulsion), or complete residence within the bitumen phase of the bitumen emulsion but at the interface (the mirror image of surface adsorption).

The interactions of the emulsifier with the interfacial region of a dispersed bitumen droplet can influence the interfacial rheology of the bitumen in two ways. The emulsifier can provide a lubricity layer or slip plane between and amongst the droplets or they can disrupt the structure of the asphaltene fractions of the bitumen at and within the interface. It must be noted that the hardness and flow resistance of bitumen is to a large degree a function of the asphaltene components within a particular bitumen. The model of bitumen favored by those working in the area of heavy oil processing consists of asphaltenes of varying molecular weights existing as dissolved and colloidal entities within the maltene phase of the bitumen. Penetration of the associated asphaltenes within a bitumen by molecules or parts of molecules will tend to disrupt the surface structure of the bitumen. The concomitant result of this is a reduction in the resistance to flow of the surface regions of the droplets. By definition, the resistance to flow is referred to as viscosity. In order to penetrate the structure formed by the asphaltenes, a foreign molecule or parts of that molecule must have similar cohesive energy density to the asphaltenes. From a thermodynamic point of view, this means that if the molecules of two different substances have similar cohesive densities and are placed in close proximity to each other and subjected to the same conditions (such as temperature, pH, ionic strength etc.) the molecules of the two will intermingle at the level of individual molecules. This is by definition solvation or dissolution. By convention, the substance present in greater concentration is referred to as the solvent and the other, the solute.

One of the most widely accepted means of quantitatively describing the cohesive energy density is by use of a parameter called the solubility parameter. This number is actually the square root of the cohesive energy density. Various models of the solubility parameter have been proposed. The most widely referred to models are those of Hildebrand and Hansen. As a solubility class, asphaltenes have a solubility parameter ($\delta$) of 19-24 (MPa)$^{1/2}$. Consequently, a substance with a solubility parameter within or slightly above this range should in principle dissolve in and disrupt the internal structure of the asphaltenes of an asphalt. Somewhat relevant to this argument are references to the fact that London dispersion forces are the major contributors to the strength and complexity of the asphaltene structure within a given asphalt. This must be considered when using the more complex Hansen solubility parameter instead of the Hildebrand version. Further to this, it is common practice to quantify the asphaltene fraction of bitumen by precipitating the asphaltenes from a sample of that asphaltene via the addition of either pentane or heptane. These two hydrocarbons have Hildebrand solubility parameters of 14.3 and 15.1 (MPa)$^{1/2}$, respectively. Consequently, solubility parameters in the range of 19-25 (MPa)$^{1/2}$ or higher will identify molecules or parts of molecules which have the ability to disrupt asphaltene structure and consequently fluidize that bitumen, while molecules or parts of molecules with solubility parameters similar to those of the C5-C7 hydrocarbons have the potential to reflocculate or coagulate already dispersed asphaltenes.

From a molecular point of view, the cohesive energy density or solubility parameter of a molecular is determined by its chemical composition or make-up. Consequently, it is also a function of the raw materials and the manufacturing process used to manufacture that substance, or more succinctly, the nature of the specific substance. In the case of emulsifiers, the solubility parameter can also be related to the hydrophile-lipophile balance (HLB) by the expression:

$$HLB = \frac{(\delta - 16.8) \times (54)}{\delta - 12.3}$$

In the present work, a series of emulsifiers was shown to demonstrate the compressibility and early strength development seen to be an advantage of the method of the present disclosure. Those emulsifiers were observed to have functional groups with solubility parameters in the range of 24-25 (MPa)$^{1/2}$ and hydrophobes in the range of 8-16 (MPa)$^{1/2}$. The most dramatic failure was observed with an emulsifier system with a low level of functionality of the requisite type and solubility parameter. The solubility parameter of the entire emulsifier system was also well into the high 30's to low 40's. Additionally, the usable functionality which was present was shown by model studies to be sterically hindered from penetration into the interfacial regions of the bitumen/water interface. It is thus a preferred embodiment of the present disclosure to formulate the bitumen emulsions with emulsifiers comprised of functional groups and structure, which impart the requisite solubility characteristics (as described above) for controlling temperature-dependent interfacial rheology.

The following examples are provided to further illustrate the present disclosure and are not to be construed as limiting the disclosure in any manner.

In the following examples, the bituminous compositions of bitumen emulsion and aggregate were either mixed with an automated bucket mixer (Example 1) or by hand (Examples 2-14). The mixtures of bitumen emulsion and aggregate were compacted immediately after preparation while the mixtures were at production temperatures. A Strategic Highway Research Program (SHRP) gyratory compactor (commercially available from Pine Instruments) was used to compact the bituminous compositions into pills at a gyratory angle of 1.25° and a ram pressure of 600 kPa using 30 gyrations. Immediately after compaction, the bituminous composition pills were placed in a 25° C. oven for curing. After curing, the pills were evaluated for compressive strength (i.e., Marshall stability). The compressive strength value obtained after four hours of curing at ambient temperature (25° C.) is referred to herein as "early strength." A stabilometer (commercially available from Pine Instruments) was used to measure the compressive strength of the compacted specimens. The mean particle sizes of each of the bitumen emulsions employed in the following examples were less than 10 microns.

The aggregate used in the following examples was crushed granite conforming to gradation and property specifications for a dense-graded, ½-inch nominal paving mixture commonly used for production of pavement wearing courses. All aggregate samples were oven-dried (110° C.) before usage to remove moisture. In the comparative cold mix examples, the aggregate was allowed to cool to room temperature before mixing with the bituminous emulsion. In the comparative hot mix examples, the aggregate was heated to a temperature in the range of about 140° C. to 160° C. before mixing with bitumen heated to an equivalent temperature. All graded aggregate samples were 1,000 grams.

Coating was measured using a modification of the commonly known instrumental luminescence method of Deneuvillers et al. Coating values in the examples below are expressed in percentages, indicating the measured percentage of aggregate surface coated by bitumen.

EXAMPLE 1

Bituminous compositions of the present disclosure were prepared by the following procedure. Solvent-free bitumen emulsions were prepared using one of three different emulsifiers (A, B, and C) based on alkyl polyamines at dosages ranging from 0.3% to 0.5% by total weight of the respective bitumen emulsion. Emulsifier A was a blend of 0.4% by total weight of the bitumen emulsion (bwe) of saturated and unsaturated C16-C18 tallow tripropylenetetramines and 0.1% bwe of saturated and unsaturated C16-C18 tallow monoamines. Emulsifier B was 0.3% bwe of saturated and unsaturated C16-C18 tallow polypropylenepolyamine blends. Emulsifier C was a blend of 0.45% bwe of alkyl polypropylenetetramine and 0.01%-0.05% bwe of a mixture of saturated and unsaturated C16-C18 alkyl monoamines, -diamines, and -triamines. The respective emulsifiers were dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was of Venezuelan origin and had a performance-grade of PG64-22. The bitumen was heated to 130° C. and added to the Atomix colloid mill, wherein the soap solution and bitumen mixture was processed to produce bitumen emulsion. The bitumen content of the finished bitumen emulsions were about 60-63% bwe. The bitumen emulsions were subsequently diluted with water to 53.3% bitumen content prior to mixing with aggregate.

As noted above, the aggregate used was crushed granite conforming to gradation and property specifications for ½-inch nominal wearing course paving aggregate. The aggregate as received from the quarry was oven dried to remove moisture. The dried aggregate was separated into size fractions from particles passing the 12.5-mm sieve to particles passing the 0.075 micron sieve. The fractions were combined in quantities to give an aggregate gradation conforming to the standard for ½-inch nominal, dense-graded aggregate for surface and wearing course pavements. This combination of aggregate water-free fractions meeting the ½-nominal gradation standard is referred to as the graded aggregate.

For bituminous compositions made in this example according to the method of the present disclosure, the graded aggregate was heated to about 80° C. in an oven while the bitumen emulsion was heated to about 60° C. About 1,000 grams of heated graded aggregate were placed in a 1-gallon stainless steel bucket, and the bucket was placed in the automatic bucket mixer. To the 1,000 grams of aggregate at 80° C. was added, with stirring, 90 g of 60° C. bitumen emulsion. The mixing was continued for an additional 60 seconds to produce bituminous compositions containing about 4.8% bitumen by total weight of the graded aggregate.

The resulting bitumen compositions (having a temperature in the range of about 60° C. to about 80° C.) were added immediately to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°.

The compacted bituminous compositions were placed in a 25° C. oven and allowed to cure for four hours. After four hours of curing, the physical and performance properties of the compacted and cured bituminous compositions were measured.

For comparison purposes, a series of cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket mixer.

The resulting cold mix bitumen compositions at ambient temperature were added immediately to a 100-mm diameter gyratory compaction mold, which was also at ambient temperature. The ambient-temperature bitumen compositions were then compacted using 30 gyrations of a SHRP Pine gyratory compactor at 600 kPa pressure and a gyration angle of 1.25°.

The compacted bitumen compositions were placed in a 25° C. oven and allowed to cure for four hours. After four hours of curing, the physical and performance properties of the compacted and cured cold mix bituminous compositions were measured.

TABLE I

| Physical or Performance Property | Method of the Present disclosure | | | Cold Mix Method | | |
|---|---|---|---|---|---|---|
| | Emulsifier A | Emulsifier B | Emulsifier C | Emulsifier A | Emulsifier B | Emulsifier C |
| Coating (%) | 99 | 94 | 94 | 95 | 89 | 99 |
| Specimen Height (mm) | 62.4 | 62.7 | 62.2 | 66.1 | 66.0 | 65.8 |
| Compressive Strength after 4 hours at 25° C. (lb-f) | 3000 | 3100 | 3325 | 2100 | 1460 | 2000 |

A comparison of the respective bituminous compositions was made for three critical physical and performance properties—coating, densification, and strength development. Compacted specimens prepared by mixing and compacting emulsion and aggregate at ambient temperatures (i.e., according to traditional cold mix methods) showed substantially different physical and performance properties than those exhibited by the bituminous compositions made by the method of the present disclosure. These results are listed in Table 1.

As shown in Table 1, the bituminous compositions of the present disclosure had aggregate coating levels of 94% to 99%. The mixes gave compacted bituminous compositions (pills) with heights ranging from 62.2 to 62.7 mm after compaction, which were substantially denser than the cold mix pills. The same compacted bituminous compositions made according to the method of the present disclosure exhibited compressive strength (lb-f) values after storage at 25° C. four hours of 3,000-3,235 lb-f, which was substantially stronger than that exhibited by the cold mix examples. As previously mentioned, this compressive strength value, obtained after only four hours of curing at ambient temperature, is referred to herein as "early strength."

The emulsion from Example 1 used in the evaluations shown in FIG. 1, contained 0.5% by total weight of bitumen emulsion (bwe) of emulsifier (tallow polyalkylenepolyamines) at 60% residue of PG64-22 bitumen. The bitumen emulsions of the present disclosure exhibit high shear stabilities at the elevated temperatures of the present disclosure (i.e., about 50° C. to about 120° C.). FIG. 1 shows the effect of exposing a bitumen emulsion (formulated and produced according to the teachings of this disclosure) to increasing shear rates using a TA Rheometer at varying temperatures. In these experiments, the shear rate was increased from 0 to 1,000 seconds-inverse in 120 seconds. Because high shear induced coalesce of the emulsion at 25° C., the instrument experienced torque overload. Upon lifting the rotor of the rheometer, black, coalesced bitumen was observed, and grains of large coalesced droplets could be felt in what remained of the original liquid emulsion. At 80° C., the emulsion shows a smooth decrease in viscosity with increasing shear rate.

EXAMPLE 2

The physical and performance properties of bituminous compositions made using the method of the present disclosure were also compared to the properties of bitumen and aggregate mixes made according to traditional hot mix asphalt methodologies. All bituminous compositions in this example contained commercially available, performance-grade PG70-22 bitumen, and were prepared with a bitumen content of 4.8% by total weight of the graded aggregate.

Bituminous compositions of the present disclosure were prepared by the following procedure. Solvent-free bitumen emulsions were prepared using tallow polyalkylenepolyamines emulsifier at 1.0% by total weight of the bitumen emulsion (bwe). The emulsifier was dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was a commercially available, performance-grade PG70-22. The bitumen was heated to 130° C. and added to the Atomix colloid mill, wherein the soap solution and bitumen mixture was processed to produce bitumen emulsion. The bitumen content of the finished bitumen emulsion was about 60-63% bwe. The bitumen emulsions were subsequently diluted with water to 53.3% bitumen content prior to mixing with aggregate.

For bituminous compositions made in this example according to the method of the present disclosure, the graded aggregate of Example 1 was heated to about 80° C. in an oven while the bitumen emulsion was heated to about 60° C. About 1,000 grams of heated graded aggregate were placed in a 1-gallon stainless steel bucket. To the 1,000 grams of aggregate at 80° C. was added 90 g of 60° C. bitumen emulsion. The mixture was stirred by hand for approximately 60 seconds to produce the bituminous compositions containing about 4.8% bitumen by total weight of the graded aggregate.

The resulting bitumen compositions (having a temperature in the range of about 60° C. to about 80° C.) were added immediately to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°.

The compacted bituminous compositions were placed in a 25° C. oven and allowed to cure for four hours. After four hours of curing, the physical and performance properties of the compacted and cured bituminous compositions were measured.

For comparison purposes, a hot mix specimen having equivalent aggregate gradation and bitumen content was made according to standard laboratory procedures for the preparation of hot mix bituminous compositions. Graded aggregate was prepared as in Example 1. About 1,000 grams of graded aggregate heated to 140° C. were placed in a 1-gallon stainless steel bucket. To the 1,000 grams of heated aggregate was added 48 grams of a PG70-22 bitumen, which had been previously heated to 140° C. The mixture was stirred by hand for approximately 30 seconds to distribute the bitumen over the surface of the hot aggregate. The coated aggregate was returned to the oven and heated until the temperature reached 140° C. The resulting hot mix bituminous composition was removed and stirred a second time by hand for 30 seconds, then transferred to a 100-mm gyratory compaction mold which had been previously heated to 140° C. The gyratory compaction mold and bituminous composition were returned to the 140° C. oven for 20 minutes. The hot mix bitumen composition was then compacted using 30 gyrations of a SHRP Pine gyratory compactor at 600 kPa pressure and a gyration angle of 1.25°.

The compacted hot mix bituminous compositions were placed in a 25° C. oven and allowed to cure for four hours. After four hours of curing, the physical and performance properties of the compacted and cured hot mix bituminous compositions were measured.

A second compacted hot mix bituminous composition was prepared according to the aforementioned hot mix procedure except that the temperature used in all mixing, heating, and compaction steps was 160° C. instead of 140° C.

For further comparison purposes, a cold mix bituminous composition was produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

The resulting cold mix bitumen compositions at ambient temperature were added immediately to a 100-mm diameter gyratory compaction mold, which was also at ambient temperature. The ambient-temperature bitumen compositions were then compacted using 30 gyrations of a SHRP Pine gyratory compactor at 600 kPa pressure and a gyration angle of 1.25°.

The compacted bitumen compositions were placed in a 25° C. oven and allowed to cure for four hours. After four hours of curing, the physical and performance properties of the compacted and cured cold mix bituminous compositions were measured.

Standard volumetric procedures were used on all mixes (those made by the method of the present disclosure, as well as the hot mixes and cold mixes) to determine air voids (Pa). Table II shows that the mixes made by the method of the present disclosure compacted more effectively than either the hot mixes or the cold mixes. Table II further shows that the bituminous emulsions made by the method of the present disclosure gave air voids (Pa) that were comparable to those of the hot mix specimens, and substantially improved above those of the cold mix specimen. All specimens were fully coated (i.e., percent coating greater than 99%).

TABLE II

| Physical and Performance Properties | PG70-22 Cold Mix (20-23° C.) | PG70-22 Hot Mix (140° C.) | PG70-22 Hot Mix (160° C.) | Method of the Present Disclosure |
|---|---|---|---|---|
| Average Pill Height (mm) and Std. Dev. | 64.8 +/− 0.6 | 63.7 +/− 0.0 | 63.7 +/− 0.4 | 62.6 +/− 0.5 |
| Early Cure: Compressive Strength after 4 hours at 25° C. (lb-f) | 1050 | 4600 | 4800 | 2450 |

TABLE II-continued

| Physical and Performance Properties | PG70-22 Cold Mix (20-23° C.) | PG70-22 Hot Mix (140° C.) | PG70-22 Hot Mix (160° C.) | Method of the Present Disclosure |
|---|---|---|---|---|
| Full Cure: Compressive Strength after 24 hours at 60° C. (lb-f) | 4125 | 4650 | 5100 | 4875 |
| % Air Voids, Pa | 10.24 | 8.22 | 8.70 | 6.86 |

EXAMPLE 3

Bituminous compositions of the present disclosure were produced and compacted using the procedure of Example 2. Solvent-free bitumen emulsions were prepared using tallow polyalkylenepolyamines emulsifier at 0.5% by total weight of the bitumen emulsion (bwe). The bitumen employed in this example was commercially available, performance-grade PG64-22 bitumen modified with styrene-butadiene-styrene (SBS) polymer. All of the bituminous compositions in this example contained this modified PG64-22 bitumen, and each was prepared with a bitumen content of 4.8% by total weight of the graded aggregate.

For comparison purposes, a hot mix bituminous composition having equivalent aggregate gradation and bitumen content to the above-noted bituminous composition was produced and compacted using the procedure of Example 2.

For further comparison purposes a cold mix bituminous composition was also produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

TABLE III

| Physical and Performance Properties | SBS Cold Mix (20-23° C.) | SBS Hot Mix (160° C.) | Method of the Present Disclosure |
|---|---|---|---|
| Average Pill Height (mm) and Std. Dev. | 64.8 +/− 0.1 | 63.8 +/− 0.4 | 62.6 +/− 0.5 |
| Early Cure: Compressive Strength after 4 hours at 25° C. (lb-f) | 1350 | 6400 | 3400 |
| Full Cure: Compressive Strength after 24 hours at 60° C. (lb-f) | 4875 | Not run | 5750 |
| % Air Voids, Pa | 8.86 | Not run | 4.92 |

The physical and performance properties of the respective compacted and cured bituminous compositions were measured, and the results are shown in Table III.

EXAMPLE 4

Bituminous compositions of the present disclosure were produced and compacted using the procedure of Example 2. Solvent-free bitumen emulsions were prepared using alkyl alkylenepolyamine emulsifiers at dosages ranging from 1.0% to 0.5% by total weight of the bitumen emulsion (bwe). The bitumen employed in this example was a commercially available, performance-grade unmodified PG64-22. All of the bituminous compositions in this example contained this PG64-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table IV.

As shown in Table IV, the pills made with the bituminous compositions of the present disclosure exhibited compressive strength values after curing at 25° C. for four hours which were 86%-163% stronger than the identically formulated, emulsion-based cold mix bituminous compositions made and compacted at ambient laboratory conditions. Additionally, the bituminous compositions of the present disclosure showed substantially improved densification when compared to the cold mix compositions. Likewise, the present bituminous compositions had calculated air voids (Pa) 2.76 to 3.72 percent points lower than the Pa values of the comparable cold mix specimens (each mm of pill height corresponds to roughly 1.2% air content in the specimen).

TABLE IV

| | Cold mix | | | Present Disclosure | | |
|---|---|---|---|---|---|---|
| Emulsifier Dosage (%) | Pill Height (mm) | Compressive Strength after Curing 4 hours at 25° C. (lb-f) | Pill Height (mm) | Increase in Densification - Change in Pa vs cold mix (delta Pa) | Compressive Strength after Curing 4 hours at 25° C. (lb-f) | Increase in Strength Development - Percent change vs cold mix |
| 1.0 | 65.5 | 850 | 62.6 | −3.48 | 2200 | 159% |
| 0.75 | 66.0 | 950 | 62.9 | −3.72 | 2500 | 163% |
| 0.5 | 65.8 | 1400 | 63.5 | −2.76 | 2600 | 86% |

EXAMPLE 5

Bituminous compositions of the present disclosure were produced and compacted using the procedure of Example 2. Solvent-free bitumen emulsions were prepared using tallow polyalkylenepolyamine emulsifier at dosages ranging from 1.0% to 0.5% by total weight of the bitumen emulsion (bwe). The bitumen employed in this example was a commercially available, performance-grade PG70-22. All of the bituminous compositions in this example contained this PG70-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table V below.

TABLE V

|  | Cold mix | | Present Disclosure | |
| --- | --- | --- | --- | --- |
| Emulsifier Dosage (%) | Pill Height (mm) | Compressive Strength (lb-f) | Pill Height (mm) | Compressive Strength (lb-f) |
| 1.0 | 63.8 | 1300 | 62.1 | 2850 |
| 0.75 | 65.6 | 1550 | 62.4 | 3750 |
| 0.5 | 66.5 | 2000 | 63.1 | 3050 |

As shown in Table V, the pills made with the bituminous compositions of the present disclosure exhibited compressive strength values after curing at 25° C. for four hours which were 52%-142% stronger than the identically formulated, emulsion-based cold mix bituminous compositions made and compacted at ambient laboratory conditions. Additionally, the bituminous compositions of the present disclosure showed substantially improved compaction compared to the analogous cold mix compositions as measured by the heights of the pill specimens.

EXAMPLE 6

Bituminous compositions of the present disclosure were produced and compacted using the procedure of Example 2. Solvent-free bitumen emulsions were prepared using tallow polyalkylenepolyamine emulsifier at dosages ranging from 1.0% to 0.5% by total weight of the bitumen emulsion (bwe). The bitumen employed in this example was a commercially available, performance-grade PG64-22 bitumen modified with styrene-butadiene-styrene block copolymer. All of the bituminous compositions in this example contained this modified PG64-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table VI below.

TABLE VI

|  | Cold mix | | Present Disclosure | |
| --- | --- | --- | --- | --- |
| Emulsifier Dosage (%) | Pill Height (mm) | Compressive Strength (lb-f) | Pill Height (mm) | Compressive Strength (lb-f) |
| 1.0 | 65.2 | 1200 | 63.0 | 3050 |
| 0.75 | 65.6 | 1450 | 62.9 | 2800 |
| 0.5 | 66.5 | 1650 | 63.2 | 2650 |

As shown in Table VI, the pills made with the bituminous compositions of the present disclosure exhibited compressive strength values after curing at 25° C. for four hours which were stronger than the identically formulated, emulsion-based cold mix bituminous compositions made and compacted at ambient laboratory conditions. Additionally, the bituminous compositions of the present disclosure showed substantially improved compaction compared to the analogous cold mix compositions as measured by the heights of the pill specimens.

EXAMPLE 7

Bituminous compositions of the present disclosure were produced and compacted using the procedure of Example 2. Solvent-free bitumen emulsions were prepared using tallow polyalkylenepolyamine emulsifier at 0.5% by total weight of the bitumen emulsion (bwe). The bitumen employed in this example was a commercially available, performance-grade PG64-22 bitumen modified via the addition of styrene-butadiene-rubber (SBR). Two levels of bitumen modification were examined: 1% SBR bwe and 3% SBR bwe. All of the bituminous compositions in this example contained modified PG64-22 bitumen, and each was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table VII below.

TABLE VII

|  | Cold mix | | Present Disclosure | |
| --- | --- | --- | --- | --- |
| SBR modification level | Pill Height (mm) | Compressive Strength (lb-f) | Pill Height (mm) | Compressive Strength (lb-f) |
| 1% bwe | 66.8 | 950 | 63.2 | 3050 |
| 3% bwe | 67.1 | 900 | 63.4 | 2800 |

As shown in Table VII, the pills made with the bituminous compositions of the present disclosure made at 1% SBR bwe exhibited compressive strength values after curing at 25° C. for four hours which were over 220% higher than the identically formulated, emulsion-based cold mix bituminous compositions made and compacted at ambient laboratory conditions, while the pills made at 3% SBR bwe exhibited a 210% increase in compressive strength over the corresponding cold mix pills. Additionally, the bituminous compositions of the present disclosure showed substantially improved compaction compared to the analogous cold mix compositions as measured by the heights of the pill specimens.

EXAMPLE 8

Bituminous compositions of the present disclosure were produced and compacted using the procedure of Example 2. Solvent-free bitumen emulsions were prepared using modified tall oil condensate of polyethylene polyamine at dosages ranging from 1.0% to 1.5% by total weight of the bitumen emulsion (bwe). Three commercially available, performance grade bitumen types were employed in this example: a PG64-22, a PG78-28, and a styrene-butadiene-styrene (SBS) modified PG64-22. Each of the bituminous compositions was prepared with a bitumen content of 4.8% by total weight of the graded aggregate.

The bitumen emulsion used in the evaluations shown in FIG. 2, produced in Example 7 below, contains 1.0% bwe of emulsifier (modified tall oil fatty acid condensate of polyethylene polyamine).

For comparison purposes, cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

TABLE VIII

| | | Cold mix | | Present Disclosure | |
|---|---|---|---|---|---|
| Bitumen Type | Emulsifier Dosage (%) | Pill Height (mm) | Compressive Strength (lb-f) | Pill Height (mm) | Compressive Strength (lb-f) |
| PG64-22 | 1.0 | 65.5 | 800 | 62.3 | 2450 |
| | 1.5 | 62.6 | 975 | 62.5 | 1950 |
| PG78-28 | 1.5 | 63.6 | 1600 | 62.8 | 3600 |
| SBS-modified | 1.0 | 65.2 | 1150 | 62.8 | 2700 |
| | 1.5 | 63.1 | 1175 | 63.0 | 2850 |

The physical and performance properties of the respective compacted and cured bituminous compositions were measured, and the results are shown in Table VIII.

As shown in Table VIII, the pills made with the bituminous compositions of the present disclosure exhibited compressive strength values after curing at 25° C. for four hours which were stronger than the identically formulated, emulsion-based cold mix bituminous compositions made and compacted at ambient laboratory conditions. Additionally, the bituminous compositions of the present disclosure showed improved compaction compared to the analogous cold mix compositions as measured by the heights of the pill specimens.

Figure 2:
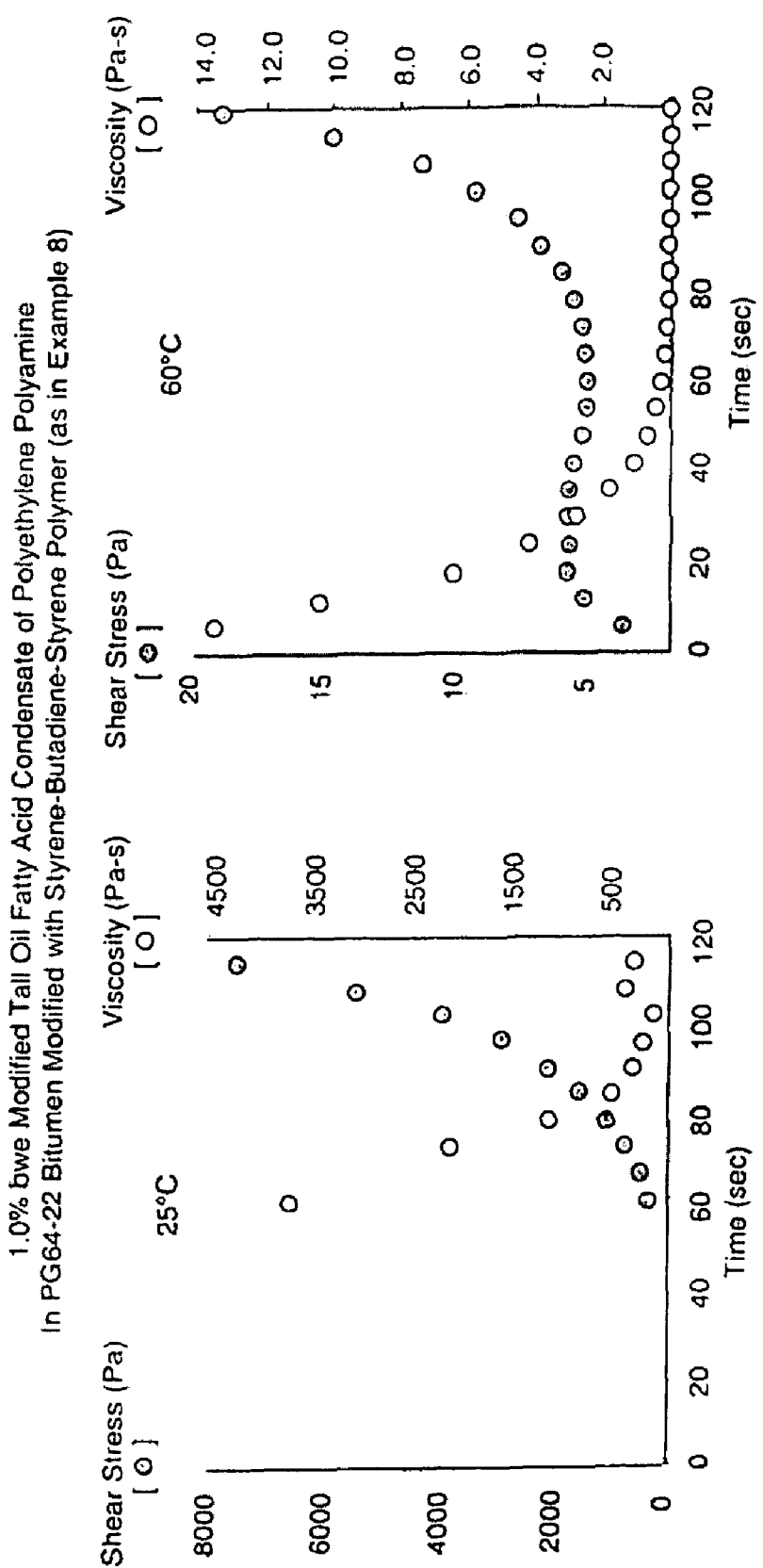
FIG. 2 shows the shear stress evaluation of a bitumen emulsion produced in Example 8 containing 1.0% bwe of emulsifier (modified tall oil fatty acid condensate of polyethylene polyamine) at 60% residue of PG64-22 bitumen.

FIG. 2 shows comparable results using a different emulsion. The bitumen emulsion used in the evaluations shown in FIG. 2, contained 1.0% bwe of emulsifier (modified tall oil fatty acid condensate of polyethylene polyamine) at 60% residue of PG64-22 bitumen (a performance-grade bitumen modified with a styrene-butadiene-styrene block copolymer). Again, at 25° C., the analysis showed the irregular viscosity build as the shear rate increased from 0 to 1,000 seconds-inverse. At 60° C., the viscosity steadily decreased as the shear rate (and shear stress) increased.

EXAMPLE 9

Bituminous compositions of the present disclosure were produced and compacted using the procedure of Example 2. Solvent-free bitumen emulsions were prepared using as an emulsifier modified and unmodified C16-C18 fatty acid condensate of polyethylene polyamine at dosages ranging from 1.0% to 1.5% by total weight of the bitumen emulsion (bwe). Three commercially available, performance grade bitumen types were employed in this example: a PG64-22, a PG70-22, and a styrene-butadiene-styrene (SBS) modified PG64-22. Each of the bituminous compositions was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present disclosure noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table IX below.

TABLE IX

| | | Cold mix | | Present Disclosure | |
|---|---|---|---|---|---|
| Bitumen Type | Emulsifier Dosage (%) | Pill Height (mm) | Compressive Strength (lb-f) | Pill Height (mm) | Compressive Strength (lb-f) |
| PG64-22 | 1.0 | 65.6 | 900 | 62.9 | 1800 |
| | 0.75 | 65.7 | 900 | 62.7 | 1800 |
| PG70-22 | 0.75 | 65.9 | 1350 | 62.0 | 2600 |
| SBS-modified | 0.50 | 66.7 | 1500 | 64.0 | 3700 |

As shown in Table IX, the pills made with the bituminous compositions of the present disclosure exhibited compressive strength values after curing at 25° C. for four hours which were stronger than the identically formulated, emulsion-based cold mix bituminous compositions made and compacted at ambient laboratory conditions. Additionally, the bituminous compositions of the present disclosure showed substantially improved compaction compared to the analogous cold mix compositions as measured by the heights of the pill specimens.

Figure 3:
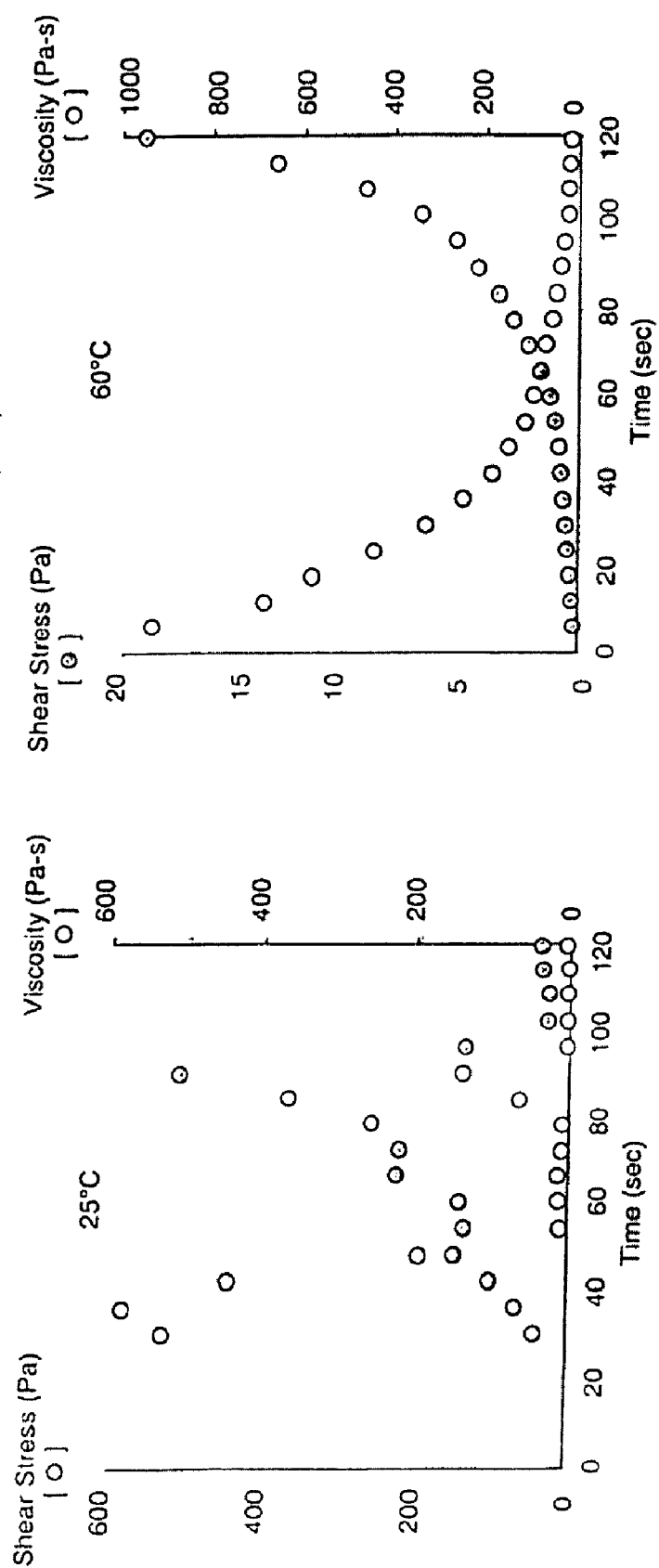
FIG. 3 shows the shear stress evaluation of a bitumen emulsion produced in Example 9 containing 0.75% bwe of emulsifier (a blend of modified and unmodified C16-C18 fatty acid condensate of polyethylene polyamine) at 60% residue of PG70-22 bitumen.

FIG. 3 also shows comparable results in yet another differently formulated bitumen emulsion. The bitumen emulsion used in the evaluations shown in FIG. 3, contained 0.75% bwe of emulsifier (modified and unmodified C16-C18 fatty acid condensate of polyethylene polyamine) at 60% residue of PG70-22 bitumen.

EXAMPLE 10

Bituminous compositions of the present invention were produced and compacted using the procedure of Example 2. Solvent-free bitumen emulsions were prepared using alkyl quaternary amines emulsifier at 0.75% by total weight of the bitumen emulsion (bwe). Three commercially available, performance grade bitumen types were employed in this example: a PG64-22, a PG70-22, and a styrene-butadiene-styrene (SBS) modified PG64-22. Each of the bituminous compositions was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table X below.

TABLE X

| | Cold mix | | Present Invention | |
|---|---|---|---|---|
| Bitumen Type | Pill Height (mm) | Compressive Strength (lb-f) | Pill Height (mm) | Compressive Strength (lb-f) |
| PG64-22 | 63.5 | 1150 | 62.7 | 2200 |
| PG70-22 | 63.5 | 1100 | 63.2 | 2500 |
| SBS-modified | 64.3 | 1250 | 63.5 | 2150 |

As shown in Table X, the pills made with the bituminous compositions of the present invention exhibited compressive strength values after curing at 25° C. for four hours which were stronger than the identically formulated, emulsion-based cold mix bituminous compositions made and compacted at ambient laboratory conditions. Additionally, the bituminous compositions of the present invention showed improved compaction compared to the analogous cold mix compositions as measured by the heights of the pill specimens.

EXAMPLE 11

Bituminous compositions of the present invention were produced and compacted using the procedure of Example 2. Solvent-free bitumen emulsions were prepared using as an emulsifier a blend of tallow polyalkylenepolyamine and aminated natural resins from the general class known as quebracho resins at 1.5% by total weight of the bitumen emulsion (bwe). Two commercially available, performance grade bitumen types were employed in this example: a PG64-22 and a styrene-butadiene-styrene (SBS) modified PG64-22. Each of the bituminous compositions was prepared with a bitumen content of 4.8% by total weight of the graded aggregate.

For comparison purposes, cold mix bituminous compositions were produced having equivalent aggregate gradation and bitumen content. The procedure for the production of the bituminous composition of the present invention noted above was followed for producing these cold mix bituminous compositions with the exception that the bitumen emulsion and the graded aggregate were each at ambient room temperature (23° C.) when mixed in the bucket.

The physical and performance properties of the respective compacted and cured bituminous compositions were measured, and the results are shown in Table XI below.

TABLE XI

| | Cold mix | | Present Invention | |
|---|---|---|---|---|
| Bitumen Type | Pill Height (mm) | Compressive Strength (lb-f) | Pill Height (mm) | Compressive Strength (lb-f) |
| PG64-22 | 64.8 | 850 | 62.9 | 1975 |
| SBS-modified | 64.0 | 1100 | 62.7 | 2450 |

As shown in Table XI, the pills made with the bituminous compositions of the present invention exhibited compressive strength values after curing at 25° C. for four hours which were stronger than the identically formulated, emulsion-based cold mix bituminous compositions made and compacted at ambient laboratory conditions. Additionally, the bituminous compositions of the present invention showed improved compaction compared to the analogous cold mix compositions as measured by the heights of the pill specimens.

EXAMPLE 12

A bituminous composition of the present invention was produced and compacted using the procedure of Example 2. A solvent-free bitumen emulsion was prepared using as an emulsifier a blend of 0.2% by total weight of the bitumen emulsion (bwe) of tallow polyalkylenepolyamines and 0.8% bwe of polyethylenepolyamine condensate of modified and unmodified fatty acids. The bitumen employed in this example was a commercially available, performance-grade PG64-22 bitumen. Each of the bituminous compositions in this example contained PG64-22 bitumen, and was prepared with a bitumen content of 4.8% by total weight of the graded aggregate.

For comparison purposes, a cold mix bituminous composition was produced having equivalent aggregate gradation and bitumen content. The procedure for the production of the bituminous composition of the present invention noted above was followed for producing the cold mix bituminous composition with the exception that the bitumen emulsion and the graded aggregate were each at ambient room temperature (23° C.) when mixed in the bucket.

TABLE XII

| | Cold mix | | Present Invention | |
|---|---|---|---|---|
| Bitumen Type | Pill Height (mm) | Compressive Strength (lb-f) | Pill Height (mm) | Compressive Strength (lb-f) |
| PG64-22 | 66.3 | 850 | 63.1 | 2400 |

The physical and performance properties of the respective compacted and cured bituminous compositions were measured, and the results are shown in Table XII.

As shown in Table XII, the pills made with the bituminous composition of the present invention exhibited a compressive strength value after curing at 25° C. for four hours which was stronger than the identically formulated, emulsion-based cold mix bituminous composition made and compacted at ambient laboratory conditions. Additionally, the bituminous composition of the present invention showed improved compaction compared to the analogous cold mix composition as measured by the heights of the pill specimens.

EXAMPLE 13

Bituminous compositions of the present invention were prepared by the following procedure. Solvent-free bitumen emulsions were prepared using tallow polyalkylenepolyamines emulsifier at 0.5% by total weight of the bitumen emulsion (bwe). The emulsifier was dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was a commercially available, performance-grade PG64-22. The bitumen was heated to 130° C. and added to the Atomix colloid mill, wherein the soap solution and bitumen mixture was processed to produce bitumen emulsion. The bitumen content of the finished bitumen emulsion was about 60-63% bwe. The bitumen emulsions were subsequently diluted with water to 53.3% bitumen content prior to mixing with aggregate.

The graded aggregate of Example 1 was heated to about 80° C. in an oven while the bitumen emulsion was heated to about 60° C. About 1,000 grams of heated graded aggregate were placed in a 1-gallon stainless steel bucket. To the 1,000 grams of aggregate at 80° C. was added 90 g of 60° C. bitumen emulsion. The mixture was stirred by hand for approximately 60 seconds to produce the bituminous compositions containing about 4.8% bitumen by total weight of the graded aggregate.

One of the resulting bitumen compositions (having a temperature in the range of about 60° C. to about 80° C.) was added immediately to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°. The compacted bituminous composition was subsequently placed in a 25° C. oven and allowed to cure for four hours. After four hours of curing, the physical and performance properties of the compacted and cured bituminous composition were measured.

The other resulting bitumen composition (having a temperature in the range of about 60° C. to about 80° C.) was immediately loaded and sealed in a polyethylene bag and placed in an oven having a temperature maintained at 60° C. After three hours, the bitumen composition (having a temperature of about 60° C.) was removed from the oven and immediately loaded into a 100-mm diameter gyratory compaction mold, which had been preheated to 60° C. The bitumen composition was then compacted using 30 gyrations of a SHRP Pine gyratory compactor at 600 kPa pressure and a gyration angle of 1.25°. The compacted bituminous composition was placed in a 25° C. oven and allowed to cure for four hours. After four hours of curing, the physical and performance properties of the compacted and cured bituminous composition were measured.

The physical and performance properties of the respective compacted and cured bituminous compositions were measured, and the results showed that storage did not adversely affect the coating, compactability, or early strength of the bituminous compositions. This indicates that the workability of the bituminous compositions was not compromised or decreased by storage.

EXAMPLE 14

Bituminous compositions of the present invention were prepared by the following procedure. Solvent-free bitumen emulsions were prepared using tallow polyalkylenepolyamines emulsifier at 0.5% by total weight of the bitumen emulsion (bwe). The emulsifier was dissolved in warm water and treated with hydrochloric acid solution to lower the pH to 2.0. The aqueous solution of emulsifier(s) in water (called the "soap solution") was heated to 55° C. and added to an Atomix colloid mill.

The bitumen employed in this example was a commercially available, performance-grade styrene-butadiene-styrene (SBS) modified PG64-22. The bitumen was heated to 130° C. and added to the Atomix colloid mill, wherein the soap solution and bitumen mixture was processed to produce bitumen emulsion. The bitumen content of the finished bitumen emulsion was about 60-63% bwe. The bitumen emulsions were subsequently diluted with water to 53.3% bitumen content prior to mixing with aggregate.

The graded aggregate of Example 1 was heated to about 80° C. in an oven while the bitumen emulsion was heated to about 60° C. About 1,000 grams of heated graded aggregate were placed in a 1-gallon stainless steel bucket. To the 1,000 grams of aggregate at 80° C. was added 90 g of 60° C. bitumen emulsion. The mixture was stirred by hand for approximately 60 seconds to produce the bituminous compositions containing about 4.8% bitumen by total weight of the graded aggregate.

One of the resulting bitumen compositions (having a temperature in the range of about 60° C. to about 80° C.) was added immediately to a 100-mm diameter gyratory compaction mold, which had been preheated to 60° C.-80° C. The bitumen compositions were then compacted using 30 gyrations of a SHRP Pine gyratory compactor at 600 kPa pressure and a gyration angle of 1.25°. The compacted bituminous composition was subsequently placed in a 25° C. oven and allowed to cure for four hours. After four hours of curing, the physical and performance properties of the compacted and cured bituminous composition were measured.

The other resulting bitumen composition (having a temperature in the range of about 60° C. to about 80° C.) was immediately loaded into a polyethylene bag and placed in an oven having a temperature maintained at 60° C. After 21 hours, the bitumen composition (having a temperature of about 60° C.) was removed from the oven and immediately loaded into a 100-mm diameter gyratory compaction mold, which had been preheated to 60° C. The bitumen composition was then compacted using 30 gyrations of a SHRP Pine gyratory compactor at 600 kPa pressure and a gyration angle of 1.25°. The compacted bituminous composition was placed in a 25° C. oven and allowed to cure for four hours. After four hours of curing, the physical and performance properties of the compacted and cured bituminous composition were measured.

The physical and performance properties of the respective compacted and cured bituminous compositions were measured, and the results showed that storage did not adversely affect the coating, compactability, or early strength of the bituminous compositions. This indicates that the workability of the bituminous compositions was not compromised or decreased by storage.

EXAMPLE 15

Solvent-free bitumen emulsions suitable for use in the production of bituminous compositions of the present invention were prepared by the following procedure. A series of solvent-free bitumen emulsions were prepared using tallow polyalkylenepolyamines emulsifier at 1.0% by total weight of the bitumen emulsion (bwe). The emulsifier was dissolved in warm water and treated with hydrochloric acid solution to lower the pH to 2.0. The aqueous solution of emulsifier in water (called the "soap solution") was heated to 55° C. and added to an Atomix colloid mill.

Four performance grade bitumen types were employed in this example in produce the series of bitumen emulsions. A commercially available PG64-22 and a commercially available styrene-butadiene-styrene (SBS) modified PG64-22 was used. Also, a PG64-22 bitumen modified via the addition of styrene-butadiene-rubber (SBR) at either 1% SBR bwe or 3% SBR bwe were employed. The respective bitumen were heated to 130° C. and added to the Atomix colloid mill, wherein the soap solution and bitumen mixture was processed to produce bitumen emulsion.

As noted in Tables XVI-XIX below, the resulting bitumen emulsions show substantially unchanged particle size distributions when held at elevated temperatures for a period of time. Table XIII shows that with the unmodified bitumen the starting mean particle diameter (mv) was lower than in the case of the SBS-modified bitumen (Table XIV), as the SBS-modified bitumens give relatively high mean particle size diameters as well as high overall particle size distributions (as reflected in 90th percentile particle diameter).

TABLE XIII

Particle Size Distribution at Elevated Temperature

| Time at Indicated | Unmodified Bitumen Emulsion Storage Temperatures | | | | | |
|---|---|---|---|---|---|---|
| Temp. | 25° C. | | 60° C. | | 80° C. | |
| (hours) | mv | <90% | Mv | <90% | mv | <90% |
| 0 | 6.7 | 12.6 | Not run | Not run | Not run | Not run |
| 24 | 6.5 | 12.2 | 6.7 | 12.9 | 6.8 | 13.1 |
| 48 | 6.9 | 13.1 | 6.4 | 12.1 | 7.0 | 13.8 |
| 120 | 7.1 | 14.2 | 5.7 | 10.6 | 4.8 | 7.4 |

TABLE XIV

Particle Size Distribution At Elevated Temperature

| Time at Indicated | SBS-Modified Bitumen Emulsion Storage Temperatures | | | | | |
|---|---|---|---|---|---|---|
| Temp. | 25° C. | | 60° C. | | 80° C. | |
| (hours) | mv | <90% | Mv | <90% | mv | <90% |
| 0 | 5.5 | 16.0 | 8.9 | 28.0 | 13.0 | 34.6 |
| 24 | 5.6 | 16.3 | 7.1 | 20.8 | 7.1 | 21.6 |
| 48 | 8.1 | 23.2 | 10.7 | 28.0 | 6.6 | 19.4 |
| 120 | 7.9 | 22.6 | 9.2 | 24.8 | 9.0 | 23.9 |

TABLE XV

Particle Size Distribution At Elevated Temperature

| Time at Indicated | 1% SBR-Modified Bitumen Emulsion Storage Temperatures | | | | | |
|---|---|---|---|---|---|---|
| Temp. | 25° C. | | 60° C. | | 80° C. | |
| (hours) | Mv | <90% | Mv | <90% | mv | <90% |
| 0 | 9.3 | 20.5 | — | — | — | — |
| 48 | 7.6 | 14.7 | 9.5 | 20.8 | — | — |
| 72 | 9.1 | 19.3 | 6.9 | 12.5 | 6.7 | 11.9 |
| 120 | 8.8 | 18.1 | 8.2 | 16.9 | 10.8 | 57.1 |

TABLE XVI

Particle Size Distribution At Elevated Temperature

| Time at Indicated | 3% SBR-Modified Bitumen Emulsion Storage Temperatures | | | | | |
|---|---|---|---|---|---|---|
| Temp. | 25° C. | | 60° C. | | 80° C. | |
| (hours) | Mv | <90% | Mv | <90% | mv | <90% |
| 0 | 9.1 | 19.2 | — | — | — | — |
| 48 | 6.6 | 11.5 | 8.4 | 17.0 | — | — |
| 72 | 5.9 | 9.3 | 6.8 | 12.6 | 7.4 | 13.7 |
| 120 | 6.7 | 11.9 | 11.3 | 23.7 | 18.2 | 43.7 |

EXAMPLE 16

Bituminous compositions of the present invention were also produced in typical full-scale operations using parallel flow drum plants in full-scale construction projects conducted in the Republic of South Africa, where many new asphalt paving technologies have been developed in recent years. In the first full-scale construction operation, solvent-free bitumen emulsions were prepared using 60/70 bitumen and emulsifiers consisting of blends of polyalkylenepolyamine condensate of modified and unmodified fatty acids and one or more tallow polyalkylenepolyamines. Percentages of the polyalkylenepolyamine condensate of modified and unmodified fatty acids ranged from 0-1.0% and percentages of the tallow polyalkylenepolyamines ranged from 0-1.0%, both by weight of the emulsion. The emulsifier was dissolved in warm water and treated with hydrochloric acid solution to lower the pH to 2.0. The aqueous solution of emulsifier(s) in water (called the "soap solution") was heated to 55° C. and added to an Atomix-type colloid mills. Aggregate was a 9.5 mm nominal andesite with mine tailings. The P-200 content in the aggregate was 7.5%. Emulsion was diluted to 50% bitumen residue prior to injection into a parallel drum plant. Sufficient emulsion was pumped into the drum mixer to yield a bituminous composition having 5.4% bitumen by weight of the aggregate. No dust was emitted from the dust collector on the drum mixer during the course of full-scale production of the bituminous composition. The temperature of samples of the production-scale bituminous composition according to this invention ranged between 80-120° C. The bituminous mixture was stored in a conventional, unheated hot-mix asphalt storage silo. After roughly eighteen hours of silo storage, the bituminous composition was discharged to standard 15-ton dump trucks. The trucks discharged the mixture to a standard hot mix paver, which distributed the mix in depths of 0.75 to 3 inches and widths of eight to twelve feet wide, according to standard lay-down construction practices. No sticking of the bituminous composition was observed in the beds of the dump trucks or in the moving parts or screed of the hot-mix paver. Three-point steel wheel rollers (13-ton) were used as break-down compacters, followed by pneumatic rollers (20-ton) for finishing compaction. Weather conditions at the time of lay-down, construction, and compaction were roughly 18° C. with a slight drizzle and wind velocity of 7-11 miles per hour. Transverse or longitudinal seams were barely visible, no raveling, rutting, or cracking was observed one hour after production or after 14 months of service under heavy daily traffic consisting of gravel and hot-mix dump trucks.

EXAMPLE 17

Bituminous compositions of the present invention were also produced on a manufacturing scale in parallel flow drum plants in a second field project the Republic of South Africa, where many new asphalt paving technologies have been developed. In the second full-scale construction job, solvent-free bitumen emulsions were prepared using 80/100 bitumen and emulsifiers consisting of blends of polyalkylenepolyamine condensate of modified and unmodified fatty acids and one or more tallow polyalkylenepolyamines. Percentages of the polyalkylenepolyamine condensate of modified and unmodified fatty acids ranged from 0-0.30% and percentages of the tallow polyalkylenepolyamines ranged from 0-0.30%, both by weight of the emulsion. The emulsifier was dissolved in warm water and treated with hydrochloric acid solution to lower the pH to 2.0. The aqueous solution of emulsifier(s) in water (called the "soap solution") was heated to 55° C. and added to an Atomix-type colloid mills. Aggregate was a 19-mm nominal basalt. The P-200 content in the aggregate was roughly 7.0%. Emulsion was produced at 68% bitumen residue. Sufficient emulsion was pumped into the drum mixer to yield a bituminous composition having 5.0% bitumen by weight of the aggregate. No dust was emitted from the dust collector on the drum mixer during the course of full-scale production of the bituminous composition. The temperature of samples of the production-scale bituminous composition according to this invention ranged between 60-120° C. The bituminous mixture was stored briefly in a conventional, unheated hot-mix asphalt storage silo before being metered to standard 15-ton dump trucks. The trucks discharged the mixture to a standard hot mix paver, which distributed the mix in depths of 0.75 to 2 inches and widths of eight to ten feet wide, according to standard lay-down construction practices. No sticking of the bituminous composition was observed in the beds of the dump trucks or in the moving parts or screed of the hot-mix paver. A tandem steel wheel roller (13-ton) was used as break-down compacters, followed by pneumatic rollers (20-ton) for finishing compaction. Weather conditions at the time of lay-down, construction, and compaction were roughly 15-20° C. Traffic was opened in less than one hour of completing the compaction. Cores were taken after roughly 18 hours of service. Nuclear gauge densities averaged 96.2% of Gmm, as targeted.

Many modifications and variations of the present invention will be apparent to one of ordinary skill in the art in light of the above teachings. It is therefore understood that the scope of the invention is not to be limited by the foregoing description, but rather is to be defined by the claims appended hereto.

We claim:

1. A bituminous composition for surface paving, at a temperature of 50-140° C. comprising:
   (a) solvent-free, oil-in-water bitumen emulsion in an amount from about 2% to about 10% by total weight of the bituminous composition, wherein the oil-in-water bitumen emulsion comprises:
      (i) bitumen in an amount from about 50% to about 75% by total weight of the bitumen emulsion,
      (ii) at least one active emulsifier in an amount from about 0.05% to about 2.0% by total weight of the bitumen emulsion, and
      (iii) water in an amount to complete the emulsion; and
   (b) aggregate in an amount from about 90% to about 98% by total weight of the bituminous composition; and
wherein the bituminous composition is in an absence of bitumen having a penetration number of more than 220 dmm as determined according to an ASTM standard method D5 at 25° C., and wherein the bituminous composition has a temperature range of about 50° C. to 140° C.

2. The composition of claim 1, wherein the bitumen emulsion comprises the bitumen in an amount range from about 60.0% to about 70.0% by total weight of the emulsion.

3. The composition of claim 1, wherein the bitumen emulsion comprises the emulsifier in an amount range from about 0.08% to about 0.75% by total weight of the emulsion.

4. The composition of claim 1, wherein the bitumen emulsion comprises a member selected from the group consisting of naturally occurring bitumens, bitumen from crude oil, bitumen from petroleum pitch, bitumen from coal tar, sulfur-modified bitumen, acid-modified bitumen, and combinations thereof.

5. The composition of claim 1, wherein the bitumen emulsion comprises a bitumen modified with at least one member selected from the group consisting of natural rubbers, synthetic rubbers, plastomers, thermoplastic resins, thermosetting resins, elastomers, styrene-butadiene-styrene, styrene-butadiene-rubber, polyisoprene, polybutylenes, butadiene-styrene rubbers, vinyl polymers, ethylene vinyl acetate, and combinations thereof.

6. The composition of claim 1, wherein the bitumen emulsion further comprises a member selected from the group consisting of styrene-butadiene rubber latex, polyisoprene latex, neoprene, associative thickeners, starch, salt, and combinations thereof.

7. The composition of claim 1, wherein the emulsifier comprises a member selected from the group consisting of amphoteric emulsifiers, cationic emulsifiers, nonionic emulsifiers and combinations thereof.

8. The composition of claim 7, wherein the amphoteric emulsifier comprises a member selected from the group consisting of sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines, lithium C-12 to C-24 alkyl amidopropyl halide methyl carboxylate betaines, C-12 to C-24 fatty imidoamines, rosin imidoamines, and combinations thereof.

9. The composition of claim 7, wherein the cationic emulsifier comprises a member selected from the group consisting of C-12 to C-24 fatty imidazolines; C-12 to C-24 fatty imidoamines; rosin imidoamines; C-12 to C-24 fatty amidoamines; rosin amidoamines; C-12 to C-24 alkyl monoamines; C-12 to C-24 alkyl polypropylene polyamines; C-12 to C-24 alkyl monoamine polyoxyethylene; C-12 to C-24 alkyl monoamine polyoxypropylene; C-12 to C-24 alkyl polypropylene monoamines polyoxyethylene; C-12 to C-24 alkyl polypropylene monoamines polyoxypropylene; C-12 to C-24 alkyl aryl monoamines; C-12 to C-24 alkyl aryl polypropylene polyamines; C-12 to C-24 quaternary amines; C-12 to C-24 alkyl ether amines; C-12 to C-24 alkylether polyamines; C-12 to C-24 alkyl polypropylene polyamine N-oxides; amine derivatives of tannins; amine derivatives of phenolic resins; amine derivatives of lignins; amine-modified polyacrylates; and combinations thereof.

10. The composition of claim 1, wherein the aggregate comprises a member selected from the group consisting of dense-graded aggregate, gap-graded aggregate, open-graded, stone-matrix aggregate, reclaimed asphalt pavement material, reclaimed roofing shingles, and combinations thereof.

11. The composition of claim 1, further characterized by an application temperature of about 50° C. to 120° C. to the surface to be paved.

12. A paved road, including a layer of a bituminous composition, wherein the bituminous composition comprises:
   (a) solvent-free, oil-in-water bitumen emulsion in an amount from about 2% to about 10% by total weight of the bituminous composition, wherein the oil-in-water bitumen emulsion comprises:
      (i) bitumen in an amount from about 50% to about 75% by total weight of the bitumen emulsion,
      (ii) at least one active emulsifier in an amount from about 0.05% to about 2.0% by total weight of the bitumen emulsion, and
      (iii) water in an amount to complete the emulsion; and
   (b) aggregate in an amount from about 90% to about 98% by total weight of the bituminous composition; and
wherein the bituminous composition is in an absence of bitumen having a penetration number of more than 220 dmm as determined according to an ASTM standard method D5 at 25° C., wherein the bituminous composition is applied to the road at a temperature range of about 50° C. and 140° C., and wherein the bituminous composition has a temperature range of about 50° C. to 140° C.

13. The composition of claim 12, wherein the bitumen emulsion comprises the bitumen in an amount range from about 60.0% to about 70.0% by total weight of the emulsion.

14. The composition of claim 12, wherein the bitumen emulsion comprises the emulsifier in an amount range from about 0.08% to about 0.75% by total weight of the emulsion.

15. The composition of claim 12, wherein the bitumen emulsion comprises a member selected from the group consisting of naturally occurring bitumens, bitumen from crude oil, bitumen from petroleum pitch, bitumen from coal tar, sulfur-modified bitumen, acid-modified bitumen, and combinations thereof.

16. The composition of claim 12, wherein the bitumen emulsion comprises a bitumen modified with at least one member selected from the group consisting of natural rubbers, synthetic rubbers, plastomers, thermoplastic resins, thermosetting resins, elastomers, styrene-butadiene-styrene, styrene-butadiene-rubber, polyisoprene, polybutylenes, butadiene-styrene rubbers, vinyl polymers, ethylene vinyl acetate, and combinations thereof.

17. The composition of claim 12, wherein the bitumen emulsion further comprises a member selected from the group consisting of styrene-butadiene rubber latex, polyisoprene latex, neoprene, associative thickeners, starch, salt, and combinations thereof.

18. The composition of claim 12, wherein the emulsifier comprises a member selected from the group consisting of amphoteric emulsifiers, cationic emulsifiers, nonionic emulsifiers and combinations thereof.

19. The paved road of claim 18, wherein the amphoteric emulsifier comprises a member selected from the group consisting of sodium C-12 to C-24 alkyl amidopropyl halide methyl carboxylate betaines, potassium C-12 to C-24 alkyl amidopropyl halide methyl carboxylate betaines, lithium C-12 to C-24 alkyl amidopropyl halide phosphate betaines, sodium C-12 to C-24 alkyl amidopropyl halide phosphate betaines, potassium C-12 to C-24 alkyl amidopropyl halide phosphate betaines, lithium C-12 to C-24 alkyl amidopropyl halide sulphate betaines, sodium C-12 to C-24 alkyl amidopropyl halide sulphate betaines, and potassium C-12 to C-24 alkyl amidopropyl halide sulphate betaines, lithium C-12 to C-24 alkyl amidopropyl halide methyl carboxylate betaines, C-12 to C-24 fatty imidoamines, rosin imidoamines, and combinations thereof.

20. The paved road of claim 18, wherein the cationic emulsifier comprises a member selected from the group consisting of C-12 to C-24 fatty imidazolines; C-12 to C-24 fatty imidoamines; rosin imidoamines; C-12 to C-24 fatty amidoamines; rosin amidoamines; C-12 to C-24 alkyl monoamines; C-12 to C-24 alkyl polypropylene polyamines; C-12 to C-24 alkyl monoamine polyoxyethylene; C-12 to C-24 alkyl monoamine polyoxypropylene; C-12 to C-24 alkyl polypropylene monoamines polyoxyethylene; C-12 to C-24 alkyl polypropylene monoamines polyoxypropylene; C-12 to C-24 alkyl aryl monoamines; C-12 to C-24 alkyl aryl polypropylene polyamines; C-12 to C-24 quaternary amines; C-12 to C-24 alkyl ether amines; C-12 to C-24 alkylether polyamines; C-12 to C-24 alkyl polypropylene polyamine N-oxides; amine derivatives of tannins; amine derivatives of phenolic resins; amine derivatives of lignins; amine-modified polyacrylates; and combinations thereof.

21. The composition of claim 12, wherein the aggregate comprises a member selected from the group consisting of dense-graded aggregate, gap-graded aggregate, open-graded, stone-matrix aggregate, reclaimed asphalt pavement material, reclaimed roofing shingles, and combinations thereof.

22. The paved road of claim 12, wherein the bituminous composition is applied to the road at a temperature range of about 50° C. to 120° C.

* * * * *